US012246410B2

(12) United States Patent
Mizutani et al.

(10) Patent No.: US 12,246,410 B2
(45) Date of Patent: Mar. 11, 2025

(54) ELECTRIC POWER TOOL

(71) Applicant: MAKITA CORPORATION, Anjo (JP)

(72) Inventors: Akira Mizutani, Anjo (JP); Ryosuke Otani, Anjo (JP); Fumiyoshi Saito, Anjo (JP)

(73) Assignee: MAKITA CORPORATION, Anjo (JP)

( * ) Notice: Subject to any disclaimer, the term of this patent is extended or adjusted under 35 U.S.C. 154(b) by 113 days.

(21) Appl. No.: 17/799,827

(22) PCT Filed: Dec. 16, 2020

(86) PCT No.: PCT/JP2020/046927
§ 371 (c)(1),
(2) Date: Aug. 15, 2022

(87) PCT Pub. No.: WO2021/166399
PCT Pub. Date: Aug. 26, 2021

(65) Prior Publication Data

US 2023/0079761 A1 Mar. 16, 2023

(30) Foreign Application Priority Data

Feb. 17, 2020 (JP) ................................ 2020-024528

(51) Int. Cl.
*B24B 49/10* (2006.01)
*B24B 23/02* (2006.01)
(Continued)

(52) U.S. Cl.
CPC .............. *B24B 49/10* (2013.01); *B24B 47/12* (2013.01); *B25F 5/02* (2013.01); *B24B 23/028* (2013.01)

(58) Field of Classification Search
CPC ....... B24B 49/10; B24B 47/12; B24B 23/028; B25F 5/02
See application file for complete search history.

(56) References Cited

U.S. PATENT DOCUMENTS

2006/0016678 A1* 1/2006 Mayer .................... H01H 3/001 200/402
2015/0263592 A1* 9/2015 Kawakami ............. B25F 5/008 451/359
(Continued)

FOREIGN PATENT DOCUMENTS

CN 202083441 U 12/2011
CN 106488830 A 3/2017
(Continued)

OTHER PUBLICATIONS

Apr. 15, 2023 Office Action issued in Chinese Patent Application No. 202080096822.8.
(Continued)

*Primary Examiner* — Joshua G Kotis
*Assistant Examiner* — Scott A Howell
(74) *Attorney, Agent, or Firm* — Oliff PLC

(57) ABSTRACT

An electric power tool. The electric power tool may include: a motor; a control device configured to control the motor; a power transmission mechanism connected to the motor; a housing that houses the motor, the control device and the power transmission mechanism; an end tool holder connected to the power transmission mechanism; an accessory configured to be detachably attached to the housing; and a detector configured to detect whether the accessory is attached or not. The detector may include: a link member configured to move with respect to the housing according to the accessory being attached or detached; a magnet fixed in position with respect to one of the link member and the housing; and a magnetic sensor fixed in position with respect to another of the link member and the housing.

24 Claims, 18 Drawing Sheets

(51) Int. Cl.
*B24B 47/12* (2006.01)
*B25F 5/02* (2006.01)

(56) References Cited

U.S. PATENT DOCUMENTS

| | | | | |
|---|---|---|---|---|
| 2017/0106490 | A1* | 4/2017 | Privett, Jr. | B24B 47/12 |
| 2017/0165824 | A1* | 6/2017 | Takeda | B24B 23/02 |
| 2018/0180497 | A1* | 6/2018 | Nishiguchi | G01L 3/104 |
| 2018/0272494 | A1* | 9/2018 | Schadow | B25F 5/026 |
| 2018/0281146 | A1* | 10/2018 | Tomonaga | B24B 49/10 |
| 2021/0220959 | A1 | 7/2021 | Matsubara et al. | |

FOREIGN PATENT DOCUMENTS

| | | | |
|---|---|---|---|
| JP | 2014-133277 | A | 7/2014 |
| WO | 2017/051893 | A1 | 3/2017 |
| WO | 2019/191443 | A1 | 10/2019 |
| WO | 2020/054631 | A1 | 3/2020 |

OTHER PUBLICATIONS

Mar. 9, 2021 International Search Report issued in International Patent Application No. PCT/JP2020/046927.

Mar. 9, 2021 Written Opinion of the International Searching Authority issued in International Patent Application No. PCT/JP2020/046927.

Oct. 19, 2023 Office Action issued in Chinese Patent Application No. 202080096822.8.

Mar. 8, 2024 Office Action issued in Chinese Patent Application No. 202080096822.8.

* cited by examiner

ELECTRIC POWER TOOL

TECHNICAL FIELD

The art disclosed herein relates to electric power tools.

BACKGROUND ART

Patent Literature 1 describes an electric power tool that includes a motor, a control device configured to control the motor, a power transmission mechanism connected to the motor, a housing that houses the motor, the control device and the power transmission mechanism, an end tool holder connected to the power transmission mechanism, an accessory configured to be detachably attached to the housing, and a detector configured to detect whether the accessory is attached or not. The detector includes a magnet fixed in position with respect to the accessory, and a magnetic sensor fixed in position with respect to the housing. According to this electric power tool, whether the accessory is attached to the housing or not is detected by a contactless detector having the magnet and the magnetic sensor, false detection in the detector caused by vibration and impact can be suppressed from occurring.

CITATION LIST

Patent Literature

Patent Literature 1: WO 2017/051893 A1

SUMMARY OF INVENTION

Technical Problem

In general, with accessories that are configured to be detachably attached to a housing, a relative positional relationship between an accessory and the housing upon when the accessory is attached to the housing may vary depending on the accessory. In the above electric power tool, the position of the magnet is fixed with respect to the accessory and the position of the magnetic sensor is fixed with respect to the housing, thus a variation in a relative positional relationship between the magnet and the magnetic sensor could occur upon when the accessory is attached to the housing, and this could adversely affect detection accuracy of the detector. The description herein provides an art configured to detect whether an accessory is attached to an electric poorer tool or not with high accuracy.

Solution to Technical Problem

The disclosure herein discloses an electric power tool. The electric power tool may comprise: a motor; a control device configured to control the motor; a power transmission mechanism connected to the motor; a housing that houses the motor, the control device and the power transmission mechanism; an end tool holder connected to the power transmission mechanism; an accessory configured to be detachably attached to the housing; and a detector configured to detect whether the accessory is attached or not. The detector may comprise: a link member configured to move with respect to the housing according to the accessory being attached or detached; a magnet fixed in position with respect to one of the link member and the housing; and a magnetic sensor fixed in position with respect to another of the link member and the housing.

According to the above configuration, since whether the accessory is attached to the housing or not is detected by a contactless detector having the magnet and the magnetic sensor, false detection in the detector caused by vibration and impact can be suppressed from occurring. Further, according to the above configuration, the magnet is fixed in position with respect to one of the link member and the housing and the magnetic sensor is fixed in position with respect to the other of the link member and the housing. Since the link member is not something that is to be attached or detached with respect to the housing for operation, a variation is not likely to occur in a relative positional relationship between the link member and the housing. Due to this, according to the above electric power tool, a variation in a relative positional relationship between the magnet and the magnetic sensor can be suppressed from occurring, and detection accuracy of the detector can be improved.

DESCRIPTION OF EMBODIMENTS

Figure 1:
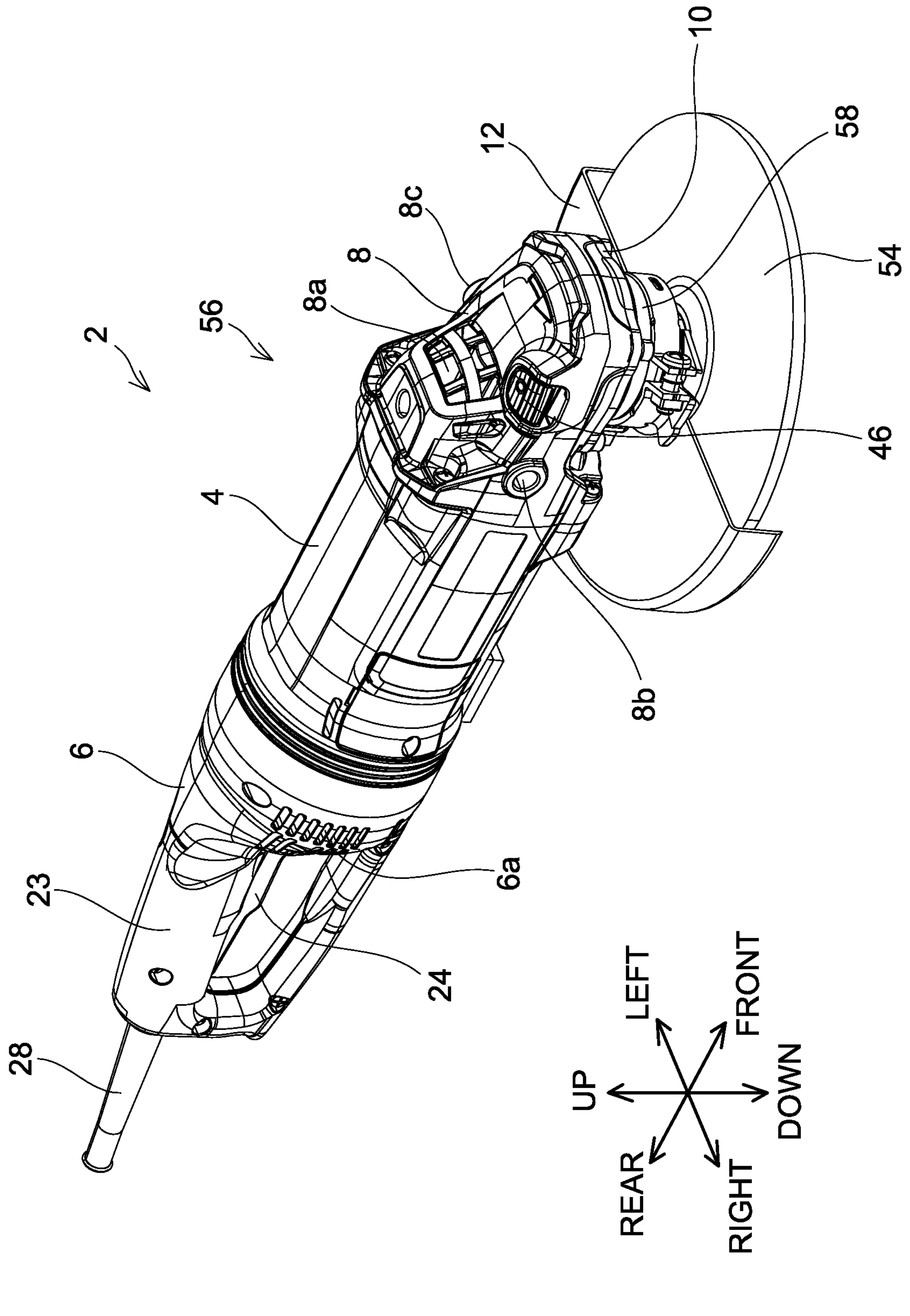
FIG. 1 is a perspective view seeing a grinder 2 of a first embodiment from front right upper side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved electric power tools as well as methods for using and manufacturing the same.

Moreover, combinations of features and steps disclosed in the following detailed description may not be necessary to practice the present disclosure in the broadest sense, and are instead taught merely to particularly describe representative examples of live present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, an electric power tool may comprise: a motor, a control device configured to control the motor; a power transmission mechanism connected to the motor; a housing that houses the motor, the control device and the power transmission mechanism; an end tool holder connected to the power transmission mechanism; an accessory configured to be detachably attached to the housing; and a detector configured to detect whether the accessory is attached or not. The detector may comprise: a link member configured to move with respect to the housing according to the accessory being, attached or detached; a magnet fixed in position with respect to one of the link member and the housing; and a magnetic sensor fixed in position with respect to another of the link member and the housing.

According to the above configuration, since whether the accessory is attached to the housing or not is detected by a contactless detector having the magnet and the magnetic sensor, false detection in the detector caused by vibration and impact can be suppressed from occurring. Further, according to the above configuration, the magnet is fixed in position with respect to one of the link member and the housing and the magnetic sensor is fixed in position with respect to the other of the link member and the housing. Since the link member is not something that is to be attached or detached with respect to the housing for operation, a variation is not likely to occur in a relative positional relationship between the link member and the housing. Due to this, according to the above electric power tool, a variation in a relative positional relationship between the magnet and the magnetic sensor can be suppressed from occurring, and detection accuracy of the detector can be improved.

In one or more embodiments, the magnet may be fixed in position with respect to the link member. The magnetic sensor may be fixed m position with respect to the housing.

If the magnet is fixed in position with respect to the housing and the magnetic sensor is fixed in position with respect to the link member, the magnetic sensor would move with respect to the housing when the link member moves with respect to the housing, thus the wiring connecting the control device and the magnetic sensor would thereby be moved. According to the above configuration, since the magnet is fixed in position with respect to the link member and the magnetic sensor is fixed in position with respect to the housing, the magnetic sensor does not move with respect to the housing even when the link member moves with respect to the housing, thus the wiring connecting the control device and the magnetic sensor is not moved.

In one or more embodiments, the link member may comprise: a swing member configured to swing with respect to the housing according to the accessory being attached or detached; and a slide member configured to slide with respect to the housing according to swinging of the swing member.

An attachment position of the accessory on the housing may be arranged in a vicinity of the end tool holder. The vicinity of the end tool holder is a position that is highly likely to be affected by dust generated in processing workpieces. Due to this, if the magnetic sensor and the magnet are arranged in a vicinity of the attachment position of the accessory, the detection accuracy of the detector could be degraded by being affected by the dust generated in processing workpieces. According to the above configuration, since the link member comprises the swing member and the slide member, the magnetic sensor and the magnet may be arranged at a position separated away from the attachment position of the accessory on the housing. The detection accuracy of the detector can be suppressed from being degraded by being affected by the dust generated in processing workpieces.

In one or more embodiments, the slide member may be configured to move along a longitudinal direction of the electric power tool with respect to the housing.

According to the above configuration, the magnetic sensor and the magnet can be arranged at a position that is further separated away from the attachment position of the accessory on the housing.

In one or more embodiments, the link member may further comprise a bias member biasing the slide member.

According to the above configuration, after the link member has moved in response to the accessory being attached (or detached), the link member can automatically be returned to an initial state in response to the accessory being detached (or attached).

In one or more embodiments, the motor may be housed in a motor housing chamber. The magnet and the magnetic sensor may be housed in a sensor housing chamber arranged separately from the motor housing chamber.

Normally, cooling air for cooling the motor flows in the motor housing chamber upon using the electric power tool. Dust may be contained in the cooling air, and if the magnet and the magnetic sensor are housed in the motor housing chamber, the detection accuracy of the detector could be degraded by being affected by the dust. According to the above configuration, since the magnet and the magnetic sensor are housed in the sensor housing chamber that is arranged separately from the motor housing chamber the detection accuracy of tire detector can be suppressed from being degraded by being affected by the dust even if the dust is contained in the cooling air flowing in the motor housing chamber.

In one or more embodiments, an opening through which a wiring is to pass may be defined in the sensor housing chamber, the wiring being configured to connect the magnetic sensor and the control device to each other. The electric power tool may further comprise a sealing member closing the opening around the wiring.

According to the above configuration, dust can be suppressed from entering into the sensor housing chamber through the opening through which the wiring for connecting the magnetic sensor and the control device passes.

In one or more embodiments, the sensor housing chamber may be disposed on an outer surface of the housing.

According to the above configuration, since the sensor housing chamber docs not need to be disposed inside the housing, an internal space of the housing can be made compact.

In one or more embodiments, the electric power tool may further comprise a magnetic shield member covering an outside of the magnetic sensor.

According to the above configuration, the magnetic sensor can be suppressed from being affected by a magnetic force from a magnetic force source outside the electric power tool.

In one or more embodiments, the magnetic sensor may be arranged on an opposite side from the power transmission mechanism in a longitudinal direction of the power tool as seen from the motor.

In the longitudinal direction of the electric power tool, a portion on the opposite side from the power transmission mechanism as seen front the motor has more vacant space as compared to a side on which the power transmission mechanism is arranged as seen from the motor. According to tire above configuration, the space on the opposite side from the power transmission mechanism as seen from the motor in the longitudinal direction of the electric power tool can be utilized efficiently.

In one or more embodiments, the electric power tool may further comprise: a power cable configured to be connected to an AC power source; and a power circuit configured to convert AC power supplied from the power cable to DC power.

In the electric power tool that uses the AC power from the AC power source, the AC power is converted to the DC power by the power circuit and this DC power is supplied to a microcomputer of the control device and the sensors. In general, different types of contactless sensors (such as photocoupler, photo interrupter) that are not a magnetic sensor require greater DC power as compared to the magnetic sensor. Due to this, when a different type of contactless sensor that is not the magnetic sensor is to be used in the detector, a power circuit with a larger capacity needs to be used. According to the above configuration, since the magnetic sensor is used in the detector and the magnetic sensor does not require such large DC power, the power circuit can be made compact. Further, in the electric power tool that uses the AC power from the AC power source, insulation must be secured between a metal component arranged in the vicinity of the attachment position of the accessory and the wiring connecting the power circuit and the magnetic sensor. According to the above configuration, since the magnetic sensor can be arranged at a position separated away from the attachment position of the accessory, the insulation between the metal component arranged in the vicinity of the attachment position of the accessory and the wiring connecting the power circuit and the magnetic sensor can be secured.

In one or more embodiments, a slide groove and a sensor housing chamber communicating with the slide groove may be disposed on an outer surface of the housing. The link member may comprise a slide member arranged from the slide groove over the sensor housing chamber, and configured to slide with respect to the housing. The magnet may be fixed in position with respect to the slide member. The magnetic sensor may be arranged in the sensor housing chamber. The electric power tool may further comprise a sensor cover that covers the slide groove and the sensor housing chamber.

According to the above configuration, since the slide member, the magnet, and the magnetic sensor are arranged outside the housing, the internal space of the housing can be made compact. Further, according to the above configuration, since the magnetic sensor and the magnet can be arranged at a position separated away from the attachment position of the accessory on the housing, the detection accuracy of the detector can be suppressed from being degraded by being affected by the dust generated in processing workpieces. Further, according to the above configuration, since the slide member, the magnet, and the magnetic sensor are covered by the sensor cover, the detection accuracy of the detector can be suppressed from being degraded by being affected by the dust.

In one or more embodiments, the sensor cover may incorporate therein a magnetic shield member covering the sensor housing chamber.

According to the above configuration, the magnetic sensor can be suppressed from being affected by the magnetic force from the magnetic force source outside the electric power tool.

In one or more embodiments, a first spring receiving wall may be disposed in the slide groove or the sensor housing chamber of the housing. The slide member may comprise a second spring receiving wall. The link member may further comprise a compression spring having one end in contact with the first spring receiving wall and another end in contact with the second spring receiving wall.

According to the above configuration, after the slide member has moved in response to the accessory being attached for detached), the slide member can automatically be returned to an initial stale in response to the accessory being detached (or attached).

In one or more embodiments, the link member may further comprise: a base member fixed on the outer surface of the housing; and a swing member configured to swing with respect to the base member according to the accessory being attached or detached. The slide member may be configured to slide with respect to the housing according to swinging of the swing member.

According to the above configuration, the slide member can be slid with respect to the housing in accordance with whether the accessory is attached or detached using a simple configuration.

In one or more embodiments, the base member may comprise a groove in which the swing member is arranged. The groove may be covered by the sensor cover.

According to the above configuration, since the swing member arranged in die groove of the base member is exposed when the sensor cover is detached, maintenance of the link member can easily be carried out.

In one or more embodiments, a vicinity of one end of the sensor cover may be fixed to the housing by a screw. A vicinity of another end of the sensor cover may be fixed to the housing by another screw.

According to the above configuration, the sensor cover can be ensured to be fixed to the housing with a simple configuration.

In one or more embodiments, one end of the sensor cover may be inserted into an inside of the housing. A vicinity of another end of the sensor cover may be fixed to the housing by a screw.

According to the above configuration, number of screw(s) for fixing the sensor cover with respect to the housing can be reduced. Thus, number of components of the electric power tool can be reduced.

In one or more embodiments, the electric power tool may further comprise a battery pack configured to be detachably attached to the housing. The electric power tool may be configured to be operated by DC power supplied from the battery pack.

According to the above configuration, since a power cable for supplying electric power to the electric power tool becomes unnecessary, workability for a user can further be improved.

In one or more embodiments, the control device may be configured to prohibit the motor from being driven when the detector does not detect that the accessory is attached.

According to the above configuration, a situation in which the electric power tool is used in a slate of having the accessory detached can be avoided.

In one or more embodiments, the accessory may be a wheel cover.

According to the above configuration whether the wheel cover is attached to the electric power tool or not can accurately be detected.

First Embodiment

As shown in FIG. 1, a grinder 2 of the present embodiment comprises a motor housing 4, a handle housing 6 attached to a rear portion of the motor housing 4, a gear housing 8 attached to a front portion of the motor housing 4, a bearing box 10 attached to a lower portion of the gear housing 8, and a wheel cover 12 detachably attached to a lower portion of the bearing box 10. The wheel cover 12 is an example of an accessory for the grinder 2. An air inlet 6*a* is defined in the handle housing 6. An air outlet 8*a* is defined in the gear housing 8.

Figure 2:
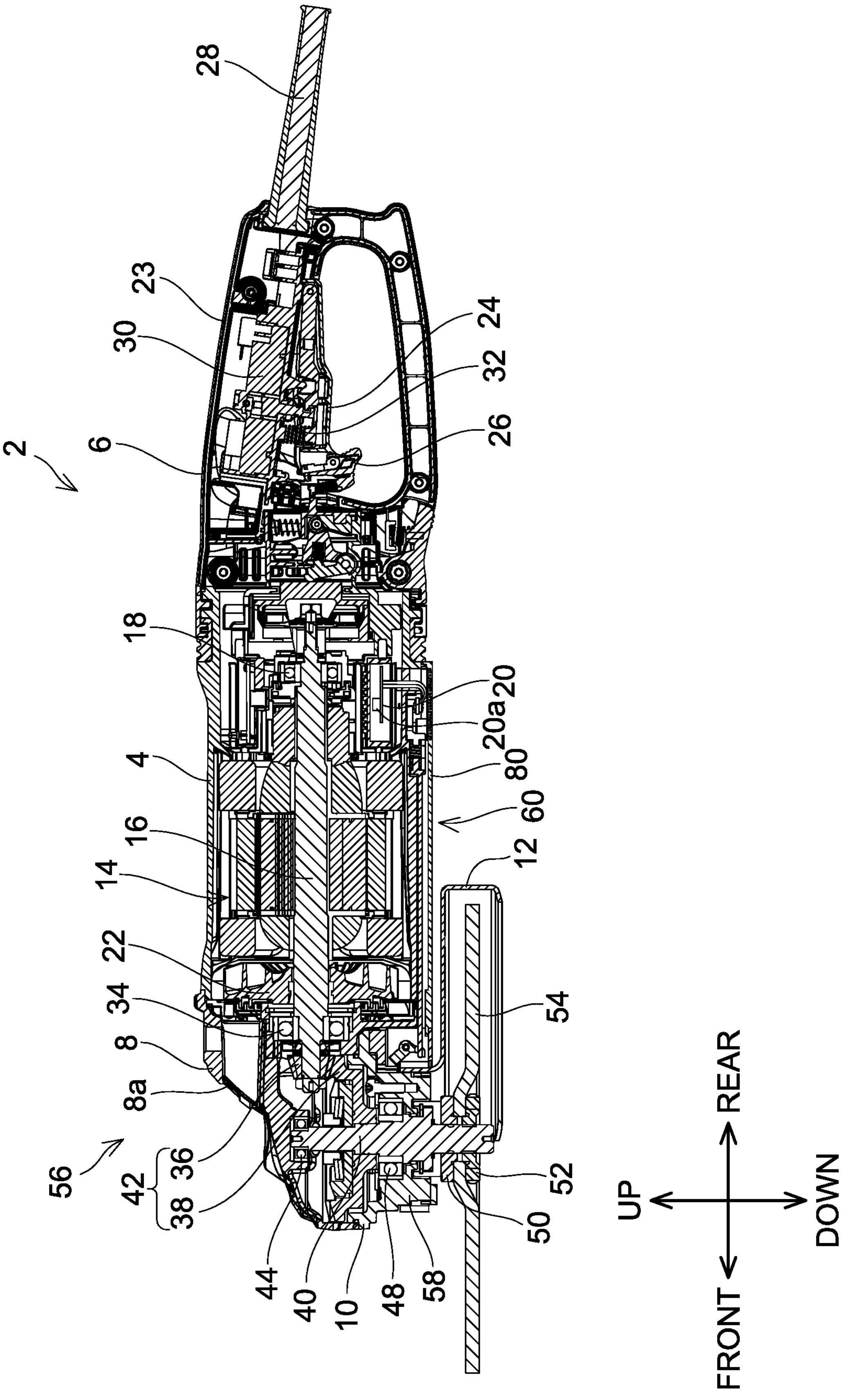
FIG. 2 is a vertical cross-sectional view of the grinder 2 of the first embodiment.

As shown in FIG. 2, a motor 14 is housed inside the motor housing 4. The motor 14 is a brush motor, for example. The motor 14 comprises an output shaft 16 extending in a front-rear direction. A vicinity of a rear end of the output shaft 16 is rotatably supported by the motor housing 4 via a bearing 18. Electric power is supplied to the motor 14 by a control board 20. An operation of the motor 14 is controlled by the control board 20. The control board 20 is arranged inside the motor housing 4 in a rear lower portion from the motor 14. The control hoard 20 includes a power circuit 20*a* configured to convert AC power to DC power, a microcomputer (not shown), and a triac (not shown) configured to control the electric power supplied to the motor 14. A fan 22 is attached to the output shaft 16. The fan 22 is arranged on a front side from the motor 14. When the motor 14 is driven and the output shaft 16 rotates, airflow occurs by rotation of the fan 22. When the fan 22 rotates, air flews in through the air inlet 6*a* of the handle housing 6, and the air that flowed in flows frontward inside the motor housing 4 from a rear side and flows out from the air outlet 8*a* of the gear housing 8. The airflow generated by the rotation of the fan 22 cools the motor 14 find the control board 20.

The handle housing 6 includes a grip 23 configured to be gripped by a user, a trigger lever 24 protruding downward from a lower surface of the grip 23, and a lock lever 26 disposed at a front end of the trigger lever 24. A power cable 28 configured connectable to an external AC power source is disposed at a rear end of the handle housing 6. A switch unit 30 is housed inside the grip 23. The power cable 28 is connected to the control board 20 in the motor housing 4 via the switch unit 30. The trigger lever 24 is biased downward by the compression spring 32. In a state where the user is not operating the trigger lever 24 and thus the trigger lever 24 is pressed downward by a biasing force of the compression spring 32, the switch unit 30 maintains the power cable 28 and the control board 20 cut off from each other. In this case, electric power from the power cable 28 is not supplied to the control board 20, thus the motor 14 does not rotate. When the user operates the trigger lever 24 and the trigger lever 24 is thus pulled upward, the switch unit 30 electrically connects the power cable 28 and the control board 20. In this case, the electric power from the power cable 28 is supplied to the control board 20, and the motor 14 thereby rotates. When the user operates the lock lever 26 to a lock position in a state where the trigger lever 24 is pulled up, the trigger lever 24 is maintained in the state of being pulled up even when the user releases his/her hand from the trigger lever 24. When the user further pulls up the trigger lever 24 from this state, the lock lever 26 moves from the lock position to an unlock position. When the user releases higher hand from the trigger lever 24 in this state, the trigger leva 24 is pressed down by the biasing force of the compression spring 32.

The gear housing 8 rotatably supports a vicinity of a front etui of the output shaft 16 via a bearing 34. A first bevel gear 36 and a second bevel gear 38 arranged to mesh with each other are housed in the gear housing 8. The first bevel gear 36 is fixed to a front end portion of the output shaft 16. The second bevel gear 38 is fixed to an upper end portion of a spindle 40 extending in an up-down direction. Hereinbelow, the first bevel gear 36 and the second bevel gear 38 may collectively be termed a bevel gear 42. The bevel gear 42 is a power transmission mechanism configured to reduce the rotation of the motor 14 and transmit the same to the spindle 40. The gear housing 8 rotatably supports the upper end portion of the spindle 40 via a bearing 44. As shown in FIG. 1, a shaft lock. 46 is disposed on an upper surface of the gear housing 8. When the user presses in the shaft lock 46 downward, rotation of the second bevel gear 38 is prohibited, and thus rotation of the spindle 40 is prohibited. Further, handle attaching portions 8*b*. 8*c* to which a side handle (not shown) can be detachably attached are disposed on right, and left surfaces of the gear housing 8. The side handle is an example of the accessory for the grinder 2. In a state where the side handle is attached to the handle attaching portion 8*b* or to the handle attaching portion 8*c*, the user can grip the grip 23 of the handle housing 6 with one hand and grip the side handle with the other hand to stably hold the grinder 2.

As shown in FIG. 2, the bearing box 10 rotatably supports the spindle 40 via a bearing 48. The spindle 40 is configured to rotate with respect to the bearing box 10 about a rotation axis along the up-down direction. A grinding wheel 54 can be attached to a vicinity of a lower end of the spindle 40 via an inner flange 50 and an outer flange 52. With the grinder 2, when the motor 14 rotates, grinding on a workpiece can be earned out by the grinding wheel 54 rotating along with the spindle 40 about the rotation axis. The spindle 40 can also be said as being an end tool holder configured to hold the grinding wheel 54 being an end tool. In the description below, the motor housing 4, the handle housing 6, the gear housing 8, and the bearing box 10 may collectively be termed a housing 56.

The wheel cover 12 is attached to a substantially cylindrical cover attachment portion 58 arranged on the bearing box 10. The wheel cover 12 has a shape by which it at least partially covers the grinding wheel 54 when it is attached to the grinder 2. The wheel cover 12 can be said as having a shape that at least partially covers the spindle 40 when it is attached to the grinder 2. The wheel cover 12 is configured to suppress ground particles from scattering toward the user when the grinding wheel 54 grinds the workpiece.

Figure 3:
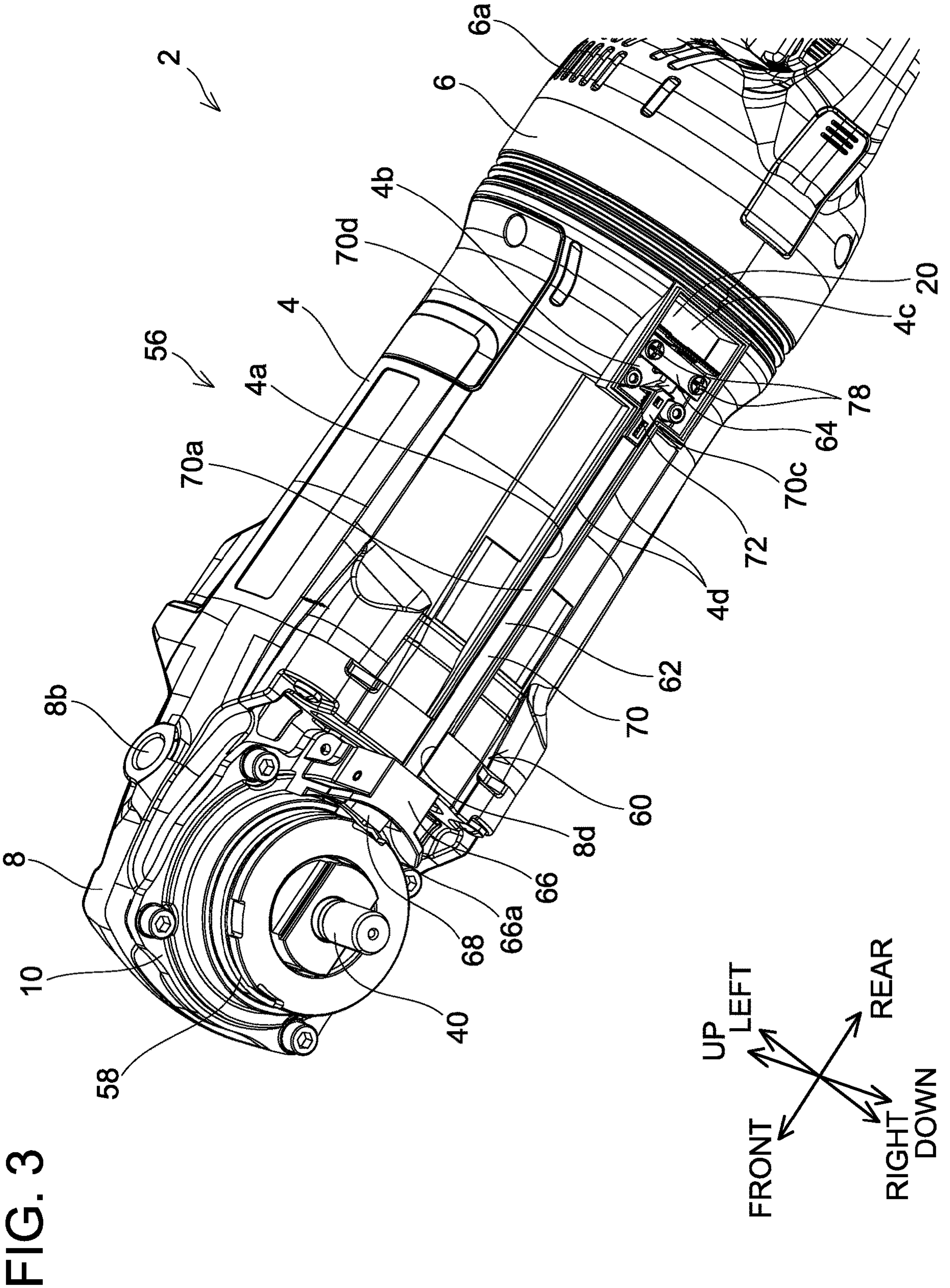
FIG. 3 is a perspective view seeing the grinder 2 of the first embodiment from front left lower side in a state having a Wheel cover 12, a sensor cover 80, and a sealing member 65 detached.

As shown in FIG. 3, the grinder 2 includes a cover detection mechanism 60. The cover detection mechanism 60 comprises a link member 62 and a sensor substrate 64.

The link member 62 includes a base member 66, a swing member 68, a slide member 70, and a compression spring 72. The base member 66 is attached to a lower portion of the bearing box 10 on a rear side from the cover attachment portion 58. The base member 66 includes a through hole 66*a* penetrating in the front-rear direction.

Figure 4:
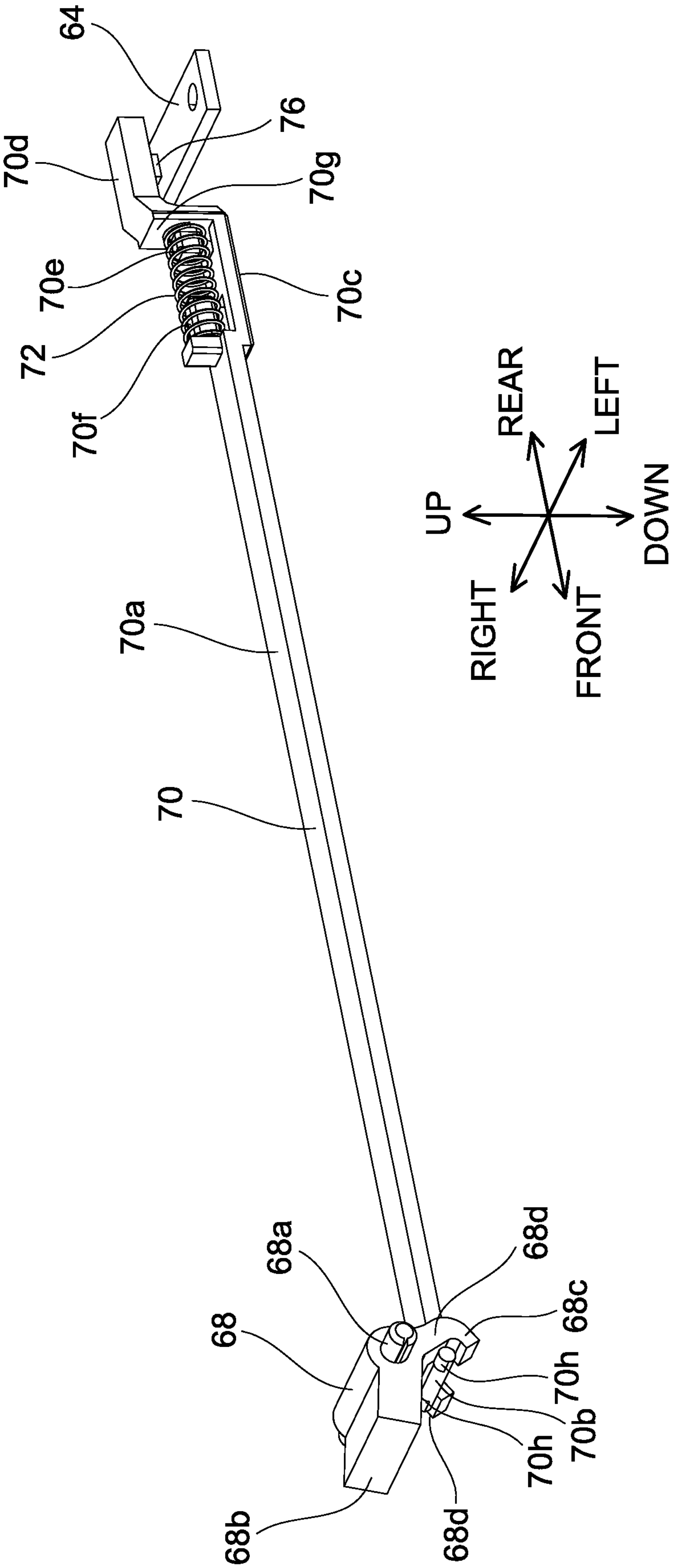
FIG. 4 is a perspective view seeing a positional relationship of a swing member 68, a slide member 70, a compression spring 72, and a sensor substrate 64 of the grinder 2 of the first embodiment from front left upper side.

As shown in FIG. 4, the swing member 68 includes a suing shaft 68*a*, a contact piece 68*b*, and engagement pieces 68*c*. The swing member 68 is arranged inside the through hole 66*a* of the base member 66. The swing member 58 is supported by the base member 66 such that it is capable of swinging about the swing shaft 68*a* that is along, a left-right direction. The slide member 70 includes a slide bar 70*a*, an engagement portion 70*b*, a spring retaining portion 70*c*, and a detector 70*d*. The slide bar 70*a* extends in the front-rear direction. The engagement portion 70*b* is disposed at a front end of the slide bar 70*a*. The engagement portion 70*b* is coupled to the engagement pieces 68*c* of the swing member 68 so as to be capable of swinging about a swing axis that is along the left-right direction. Specifically, the engagement portion 70*b* includes a substantially cylindrical shaft portions 70*h* protruding both rightward and leftward. The engagement pieces 68*c* are respectively arranged corresponding to the shaft portions 70*h*, and each include an engagement hook 68*d* that extends toward a rear lower side from the swing shaft 68*a* and further extends in a front lower side. The engagement portion 70*b* and the engagement pieces 68*c* are connected by the shaft portions 70*h* of the engagement portion 70*b* being slidably arranged in front bent portions of the engagement hooks 68*d* of the engagement pieces 68*c*. The spring retaining portion 70*c* is disposed at a rear end of the slide bar 70*a*. The spring retaining portion 70*c* includes a rear protrusion 70*e* inserted into the compression spring 72 from behind, a front protrusion 70*f* inserted into the compression spring 72 from front, and a spring receiving wall 70*g* contacting a rear end of the compression spring 72. The detector 70*d* extends rearward from the spring retaining portion 70*c*. A permanent magnet 74 (see FIGS. 7 and 9) is disposed in the detector 70*d*.

The sensor substrate 64 is arranged below the detector 70*d* of the slide member 70. The sensor substrate 64 includes a Hall sensor 76 configured to detect a magnetic force from the permanent magnet 74.

As shown in FIG. 3, a slide groove 4*a* and a sensor housing chamber 4*b* are defined in a lower outer surface of the motor housing 4, Peripheries of the slide groove 4*a* and the sensor housing chamber 4*b* are surrounded by ribs 4*d*. The slide groove 4*a* is not communicated with an inside of the motor housing 4, The sensor housing chamber 4*b* is communicated with the inside of the motor housing 4 through an opening 4*c*. In the description below, the inside of the motor housing 4 may be termed a motor housing chamber 4*e*. The sensor substrate 64 is fixed to the motor housing 4 by screws 78 in a state of being housed in the sensor housing chamber 4*b*. The sensor substrate 64 is connected to the control board 20 via a wiring 64*a*. The wiring 64*a* is laid out to extend from the sensor housing chamber 4*b* to the motor housing chamber 4*e* through the opening 4*c*. A sealing member 65 (see FIGS. 7 and 9) is attached to the opening 4*c*. The sealing member 65 may for example be a sponge. The sealing member 65 is configured to close the opening 4*c* around the wiring 64*a*.

A slide groove 8*d* is defined in a lower outer surface of the gear housing 8. The slide member 70 of the link member 62 has the slide bar 70*a* arranged in the slide groove 8*d* of the gear housing 8 and in the slide groove 4*a* of the motor housing 4 and the detector 70*d* arranged in the sensor housing chamber 4*b*. The slide member 70 is retained by the housing 56 so as to be slidable in the front-rear direction. In a state where the slide member 70 is attached to the housing 56, a front end of the compression spring 72 contacts a spring receiving wall 4*f* (see FIGS. 7 and 9) arranged in the slide groove 4*a* of the motor housing 4.

Figure 5:
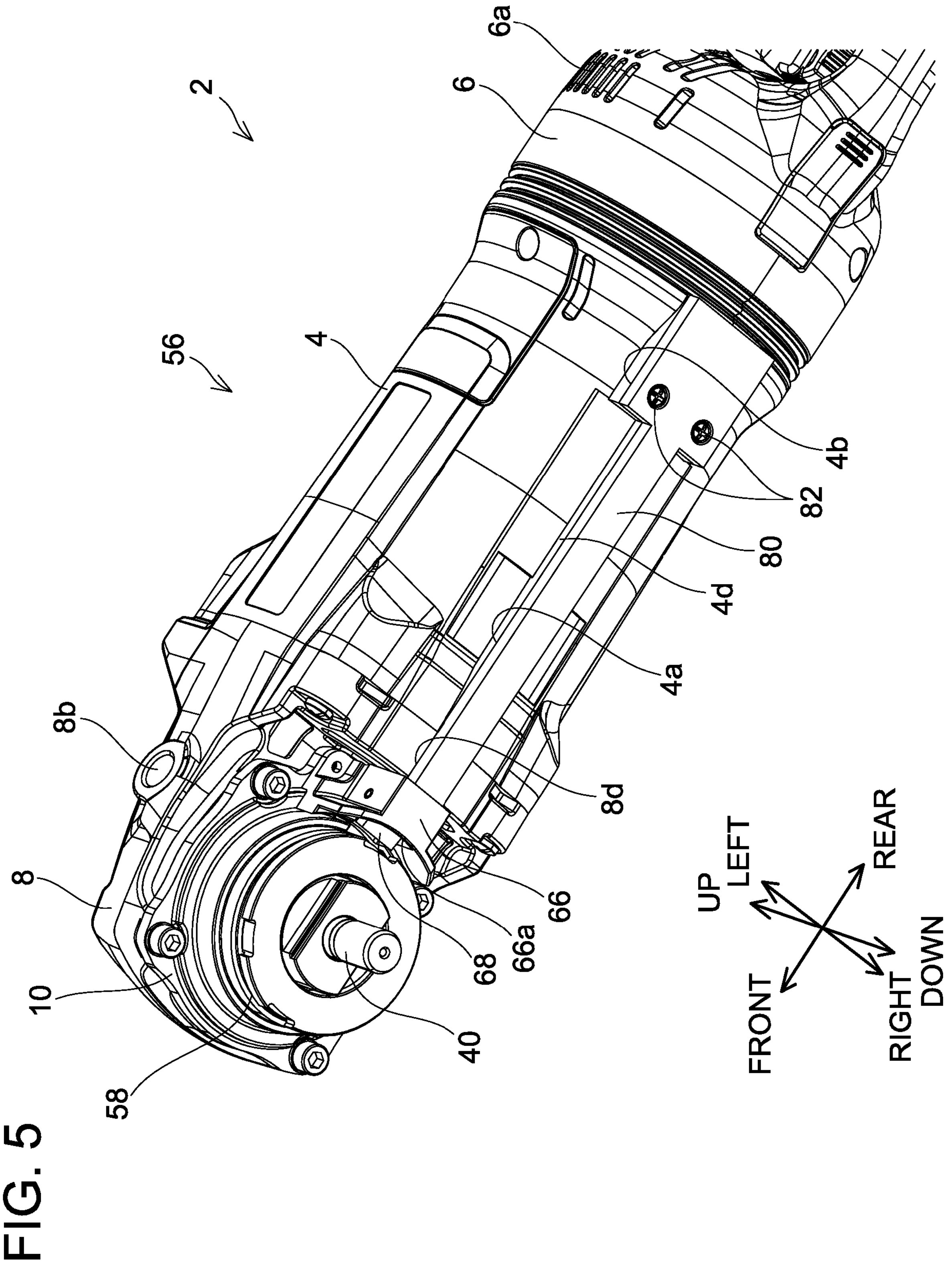
FIG. 5 is a perspective view seeing the grinder 2 of the first embodiment from the front left lower side in a state having the wheel cover 12 detached.

As shown in FIG. 5, the slide groove 4*a* of the motor housing 4, the sensor housing or; chamber 4*b*, and the slide groove 8*d* of the gear housing 8 are covered by the sensor cover 80. The sensor cover 80 is fixed to the motor housing 4 by screws 82 in a state of having its front end inserted into the gear housing 8. The slide member 70, the compression spring 72, and the sensor substrate 64 are insulated from outside by the sensor cover 80. A magnetic shield member 80*a* (see FIGS. 7 and 9) is incorporated in a portion of the sensor cover 80 corresponding to the sensor housing chamber 4*b*. The magnetic shield member 80*a* is for example a metal mesh member.

Figure 6:
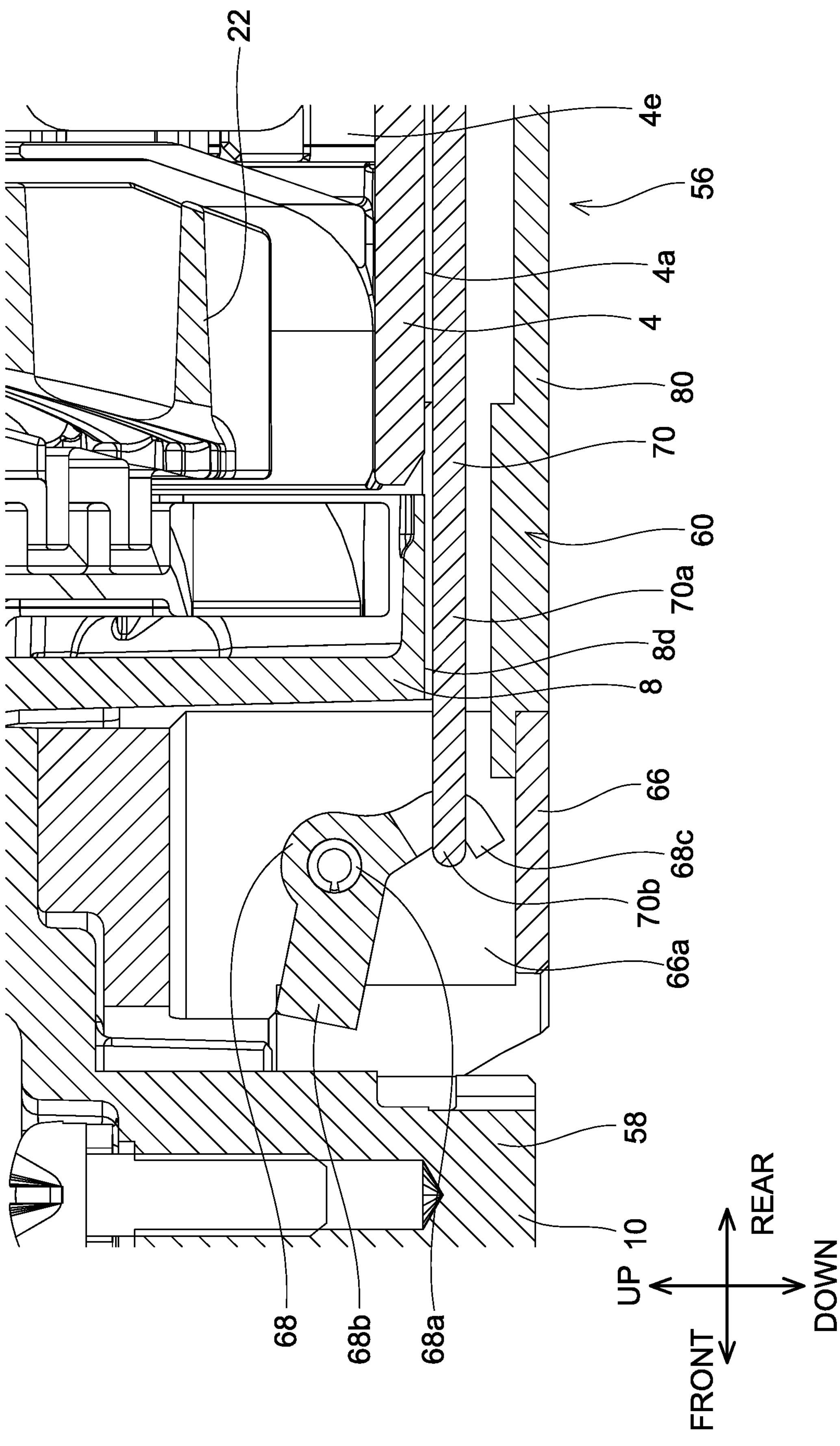
FIG. 6 is a vertical cross-sectional view of a vicinity of the swing member 68 of the grinder 2 of the first embodiment in the state having the wheel cover 12 detached.
Figure 7:
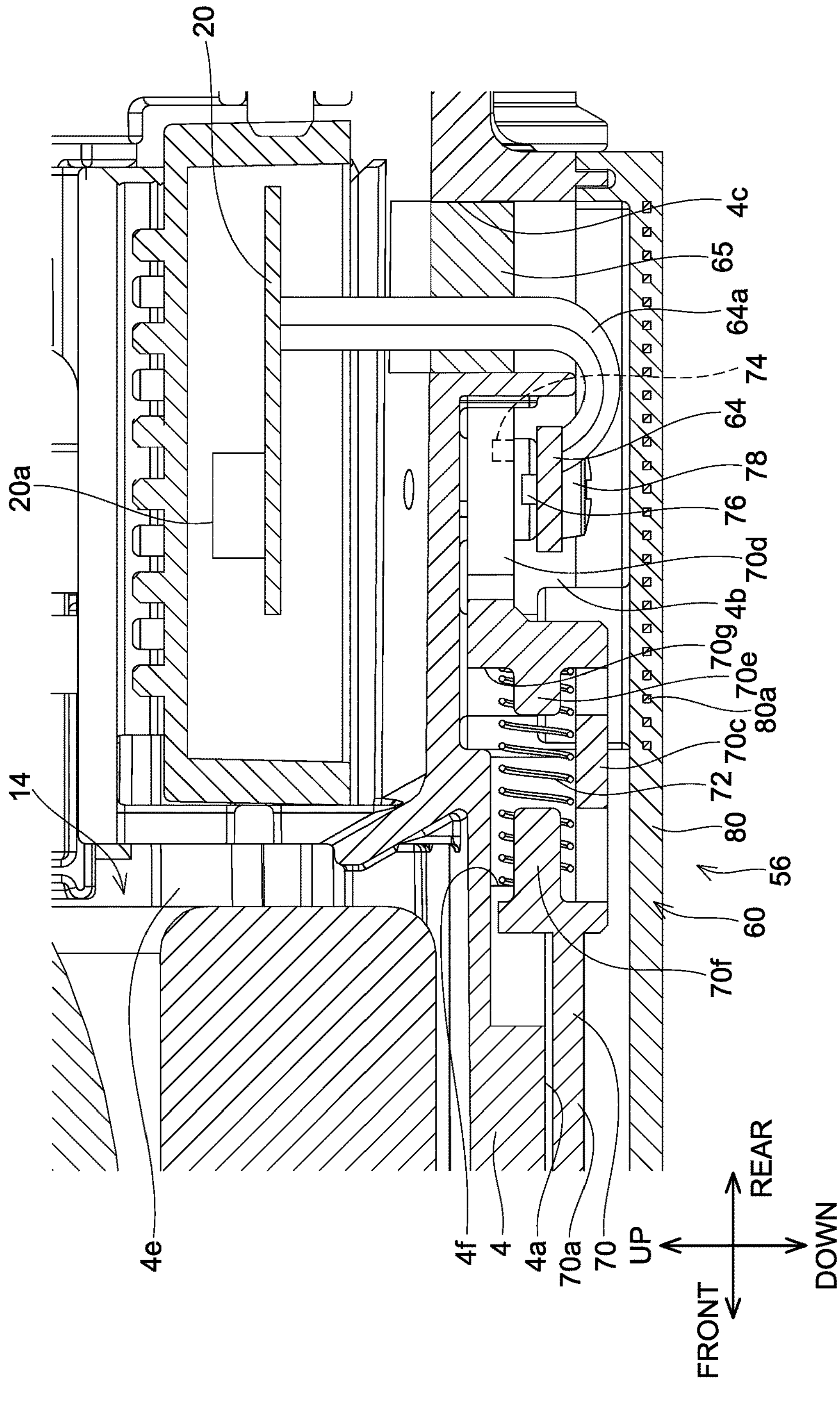
FIG. 7 is a vertical cross-sectional view of a vicinity of the sensor substrate 64 of the grinder 2 of the first embodiment in the state having the wheel cover 12 detached.

As shown in FIGS. 6 and 7, in a state where the wheel cover 12 is not attached to the housing 56, the slide member 70 is biased rearward with respect to the housing 56 by the compression spring 72. In this initial state, the permanent magnet 74 of the detector 70*d* is arranged at a position offset rearward from the Hall sensor 76 of the sensor substrate 64 as shown in FIG. 7. Further, as shown in FIG. 6, the swing member 68 is in a state of having the engagement pieces 68*c* located rearward and the contact piece 68*b* located frontward. In this case, the control board 20 determines that the wheel cover 12 is not attached to the housing 56 based on a detection signal from the Hall sensor 76. For example, the control board 20 prohibits the rotation of the motor 14 when the wheel cover 12 is not attached to the housing 56.

Figure 8:
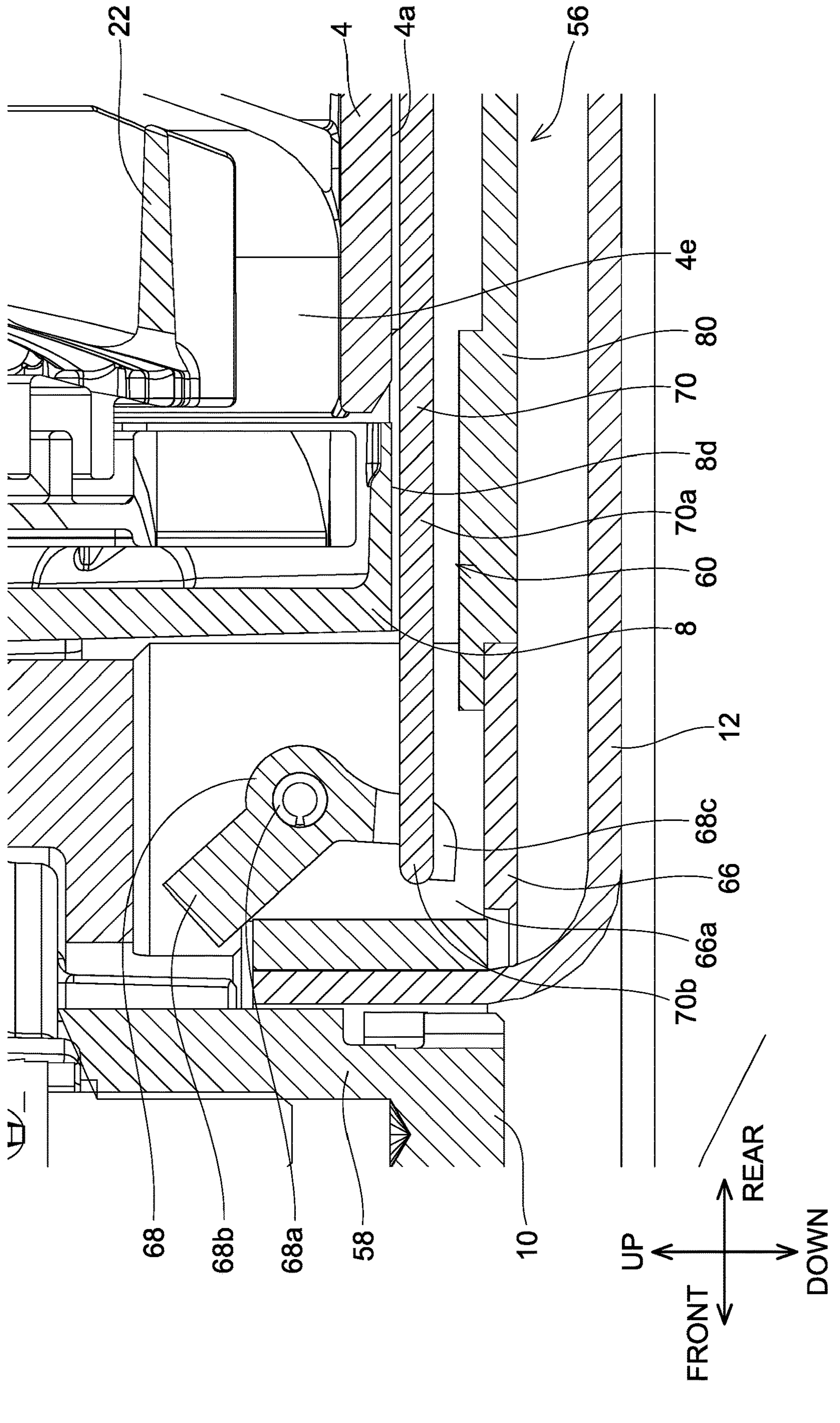
FIG. 8 is a vertical cross-sectional view of the vicinity of the swing member 68 of the grinder 2 of the first embodiment in a state having the wheel cover 12 attached.
Figure 9:
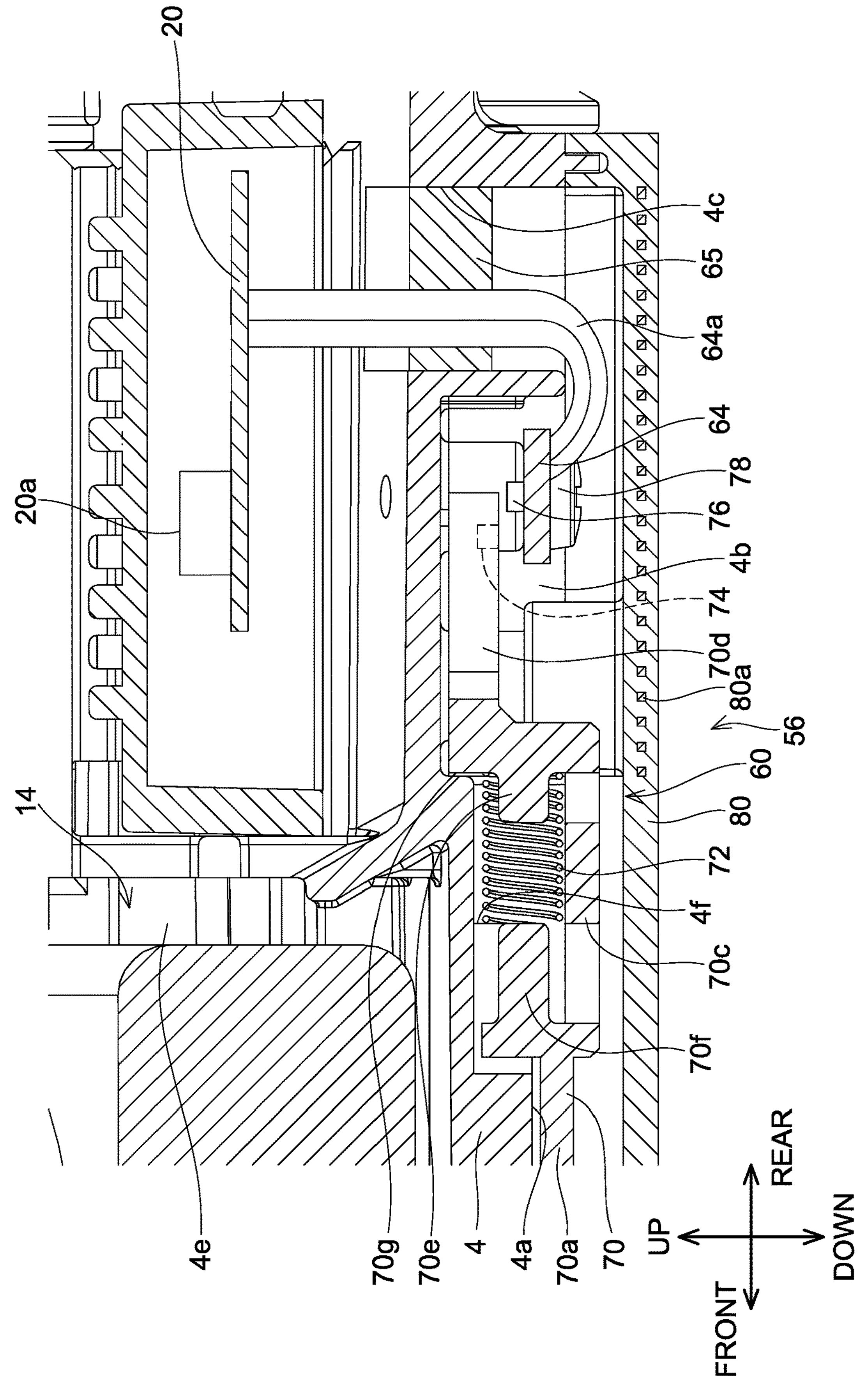
FIG. 9 is a vertical cross-sectional view of the vicinity of the sensor substrate 64 of the grinder 2 of the first embodiment in the state having the wheel cover 12 attached.

As shown in FIGS. 8 and 9, when the wheel cover 12 is attached to the housing 56, an upper end of the wheel cover 12 contacts the contact piece 68*h* of the swing member 68 by which the contact piece 68*b* is lifted upward. Due to this, the swing member 68 swings and the engagement pieces 68*c* move frontward, the engagement portion 70*b* is pulled frontward, and the slide member 70 slides frontward against the biasing force of the compression spring 72, in this state, as shown in FIG. 9, the permanent magnet 74 of the detector 70*d* is arranged at a position offset frontward from the Hall sensor 76 of the sensor substrate 64. In this case, the control board 20 determines that the wheel cover 12 is attached to the housing 56 based on the detection signal from the Hall sensor 76. For example, the control board 20 allows the rotation of the motor 14 when the wheel cover 12 is attached to the housing 56. When the wheel cover 12 is detached from the housing 56, the slide member 70 moves rearward by the biasing force of the compression spring 72 and the swing member 68 swings, by which it returns to its initial state shown in FIGS. 6 and 7.

Figure 16:
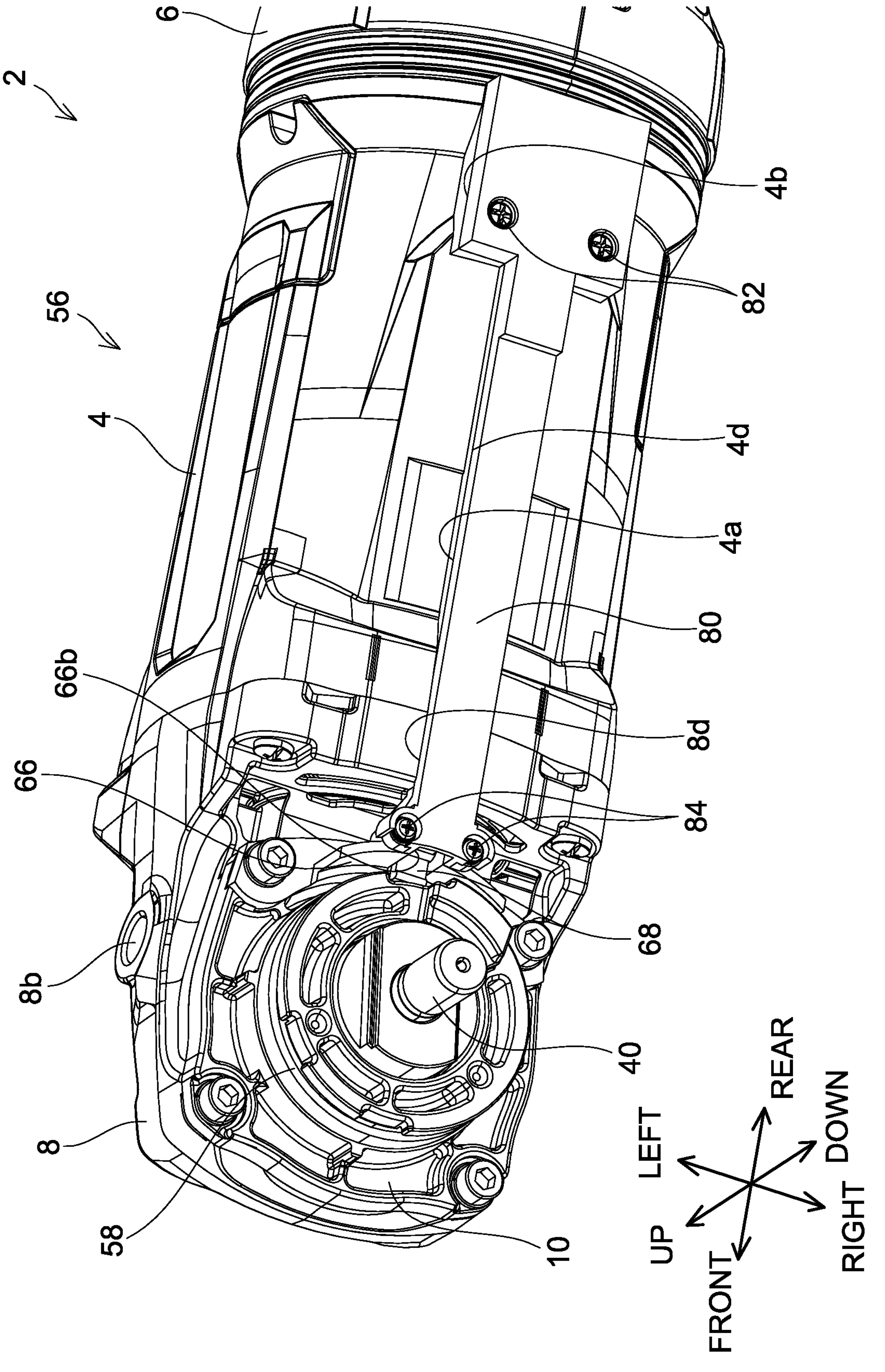
FIG. 16 is a perspective view seeing a grinder 2 of a variant of the first embodiment from front left lower side in a state having a wheel cover 12 detached.
Figure 17:
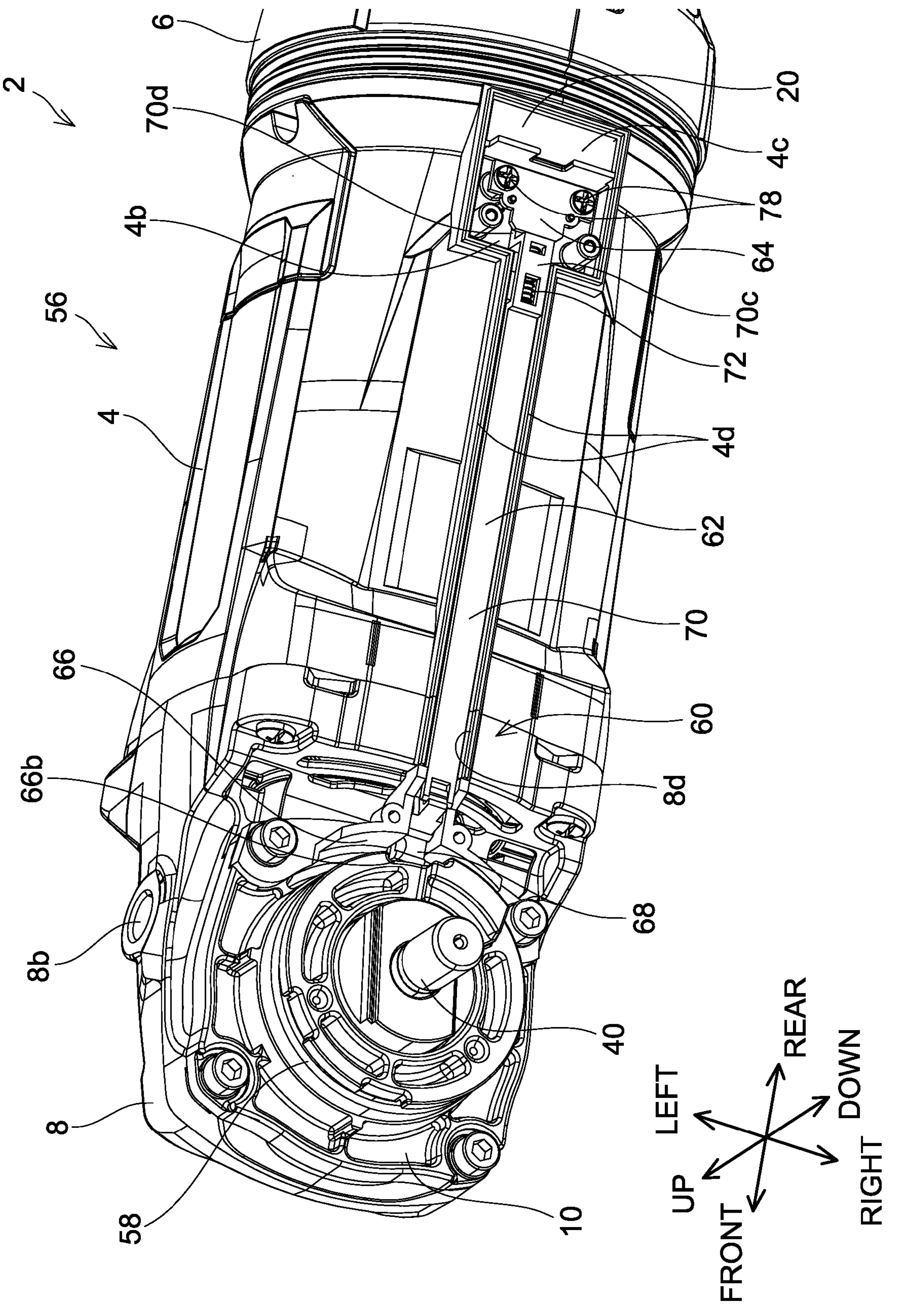
FIG. 17 is a perspective view seeing the grinder 2 of the variant of the first embodiment from the front left lower side in a state having the wheel cover 12, a sensor cover 80, and a sealing member 65 detached.

As shown in FIGS. 16 and 17, the sensor cover 80 may be fixed to the housing 56 by screws 82, 84 without inserting its front end into the gear housing 8. In the configuration shown in FIGS. 16 and 17, the front end of the sensor cover 80 is fixed to the base member 66 by the screws 84, and the vicinity of the rear end of the sensor cover 80 is fixed to the motor housing 4 by the screws 82. Further, in the configuration shown in FIGS. 16 and 17, the base member 66 includes a groove 66*h* that is open frontward and downward instead of the through hole 66*a*. In a state where the sensor cover 80 is attached, a lower side of the groove 66*b* of the base member 66 is covered by the sensor cover 80.

Figure 18:
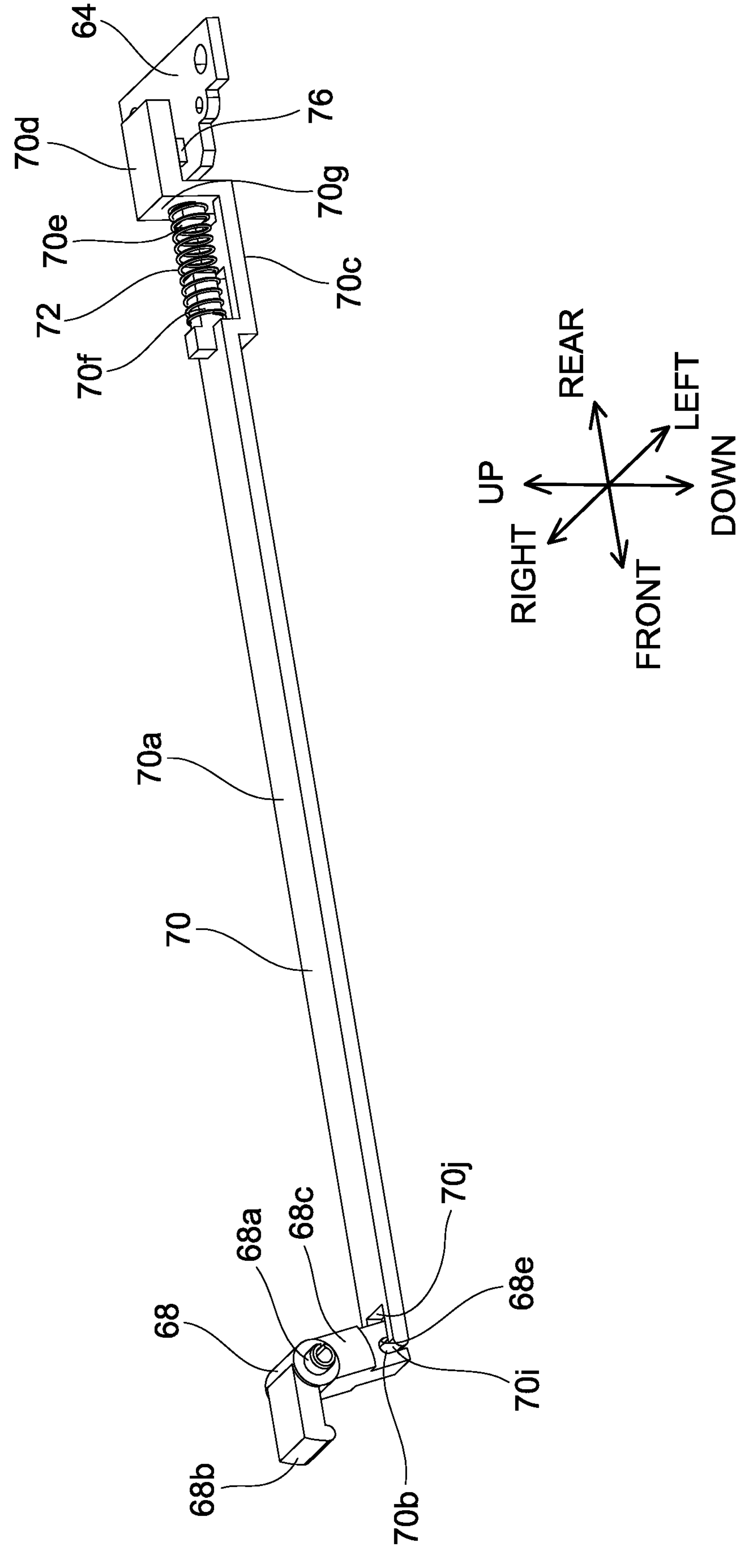
FIG. 18 is a perspective view seeing a positional relationship of a swing member 68, a slide member 70, a compression spring 72, and a sensor substrate 64 of the grinder 2 of the variant of the first embodiment from the front left upper side.

The engagement pieces 68*c* of the swing member 68 and the engagement portion 70*b* of the slide member 70 may have the configuration shown in FIG. 18 instead of the configuration shown in FIG. 4. In the configuration shown in FIG. 18, the engagement portion 70*b* includes a substantially cylindrical shaft portion 70*i* extending in the left-right direction and an opening 70*i* defined behind the shaft portion 70*i*. A groove 68*e* that is open on its right, left, and lower sides is defined at a lower end of the engagement piece 68*c*, and the engagement portion 70*b* and the engagement piece 68*c* are connected by the shaft portion 70*i* slidably arranged in the groove 68*e*. With the configuration shown in FIG. 18 as well, the engagement portion 70*b* and the engagement piece 68*c* can be connected so as to be capable of swinging about a swing axis that is along the left-right direction.

As above, in one or more embodiments, the grinder 2 (example of electric power tool) comprises: the motor 14; the control board 20 (example of control device) configured to control the motor 14; the bevel gear 42 (example of power transmission mechanism) connected to the motor 14; the housing 56 that houses the motor 14, the control board 20, and the bevel gear 42; the spindle 40 (example of end tool holder) connected to the bevel gear 42; the wheel cover 12 (example of accessory) configured to be detachably attached to the housing 56; and the cover detection mechanism 60 (example of detector) configured to detect whether the wheel cover 12 is attached or not. The cover detection mechanism 60 comprises; the link member 62 configured to move with respect to the housing 56 according to the wheel cover 12 being attached or detached; the permanent magnet 74 (example of magnet) fixed in position with respect to one of the link member 62 and the housing 56 (such as the link member 62, 106); and the Hall sensor 76 (example of magnetic sensor) fixed in position with respect to another of the link member 62 and the housing 56 (such as the housing 56).

According to the above configuration, since whether the wheel cover 12 is attached to the housing 56 or not is detected by a contactless cover detection mechanism 60 having the permanent magnet 74 and the Hall sensor 76, false detection in the cover detection mechanism 60 caused by vibration and impact can be suppressed from occurring. Further, according to the above configuration, the permanent magnet 74 is fixed in position with respect to one of the link member 62 and the housing 56 and the Hall sensor 76 is fixed in position with respect to the other of the link member 62 and the housing 56. Since the link member 62 is not something that is to be attached or detached with respect to the housing 56 for operation, a variation is not likely to occur in a relative positional relationship between the link member 62 and the housing 56. Due to this, according to the above grinder 2, a variation in a relative positional relationship between the permanent magnet 74 and the Hall sensor 76 can be suppressed from occurring, and detection accuracy of the cover detection mechanism 60 can be improved.

In one or more embodiments, the permanent magnet 74 is fixed in position with respect to the link member 62. The Hall sensor 76 is fixed in position with respect to the housing 56.

If the permanent magnet 74 is fixed in position with respect to the housing 56 and the Hall sensor 76 is fixed in position with respect to the link member 62, the Hall sensor 76 would move with respect to live housing 56 when the link member 62 moves with respect to the housing 56, thus the wiring 64*a* connecting the control board 20 and the Hall sensor 76 would thereby be moved. According to the above configuration, since the permanent magnet 74 is fixed in position with respect to the link member 62 and the Hall sensor 76 is fixed in position with respect to the housing 56, the Hall sensor 76 does not move with respect to the housing 56 even when the link member 62 moves with respect to the housing 56, thus the wiring 64*a* connecting the control board 20 and the Hall sensor 76 is not moved.

In one or more embodiments, the link member 62 comprises the swing member 68 configured to swing with respect to the housing 56 according to the wheel cover 12 being attached or detached, and the slide member 70 configured to slide with respect to the housing 56 according to swinging of the swing member 68.

In the grinder 2, the attachment position of the wheel cover 12 on the housing 56 is arranged in the vicinity of the spindle 40. The vicinity of the spindle 40 is a position that is highly likely to be affected by dust generated in processing workpieces. Due to this, if the Hall sensor 76 and the permanent magnet 74 are arranged in the vicinity of the attachment position of the wheel cover 12, the detection accuracy of the caver detection mechanism 60 could be degraded by being affected by the dust generated in processing workpieces. According to the above configuration, since the link member 62 comprises the swing member 68 and the slide member 70, the Hall sensor 76 and the permanent magnet 74 can be arranged at a position separated away from the attachment position of the wheel cover 12 on the housing 56. The detection accuracy of the cover detection mechanism 60 can be suppressed from being degraded by being affected by the dust generated in processing workpieces.

In one or more embodiments, the slide member 70 is configured to move along, the longitudinal direction of the grinder 2 with respect to the housing 56.

According to the above configuration, the Hall sensor 76 and the permanent magnet 74 can be arranged at a position that is further separated away from tire attachment position of the wheel cover 12 on the housing 56.

In one or more embodiments, the link member 62 further comprises the compression spring 72 (example of bias member) biasing the slide member 70.

According to the above configuration, after the link member 62 has moved in response to the wheel cover 12 being attached, the link member 62 can automatically be returned to the initial state in response to the wheel cover 12 being detached.

In one or more embodiments, the motor 14 is housed in the motor housing chamber 4*e*. The permanent magnet 74 and the Hall sensor 76 are housed in the sensor housing chamber 4*b* arranged separately from tire motor housing chamber 4*e*.

Upon using tire grinder 2, cooling air for cooling the motor 1A flows in the motor housing chamber 4*c*. Dust may be contained in the cooling air, and if the permanent magnet 74 and the Hall sensor 76 are housed in the motor housing chamber 4*e*, the detection accuracy of the cover detection mechanism 60 could be degraded by being affected by lire dust. According to the above configuration, since the permanent magnet 74 and the Hall sensor 76 are housed in the sensor housing chamber 4*b* that is arranged separately from the motor housing chamber 4*c*, the detection accuracy of the cover detection mechanism 60 can be suppressed from being degraded by being affected by the dust even if the dust is contained in the cooling air flowing in the motor housing chamber 4*e*.

In one or more embodiments, the opening 4*c* through which the wiring 64*a*, which is configured to connect the sensor 76 and the control board 20, is to pass is defined in the sensor housing chamber 4*h*. The grinder 2 further comprises the sealing member 65 closing the opening 4*c* around the wiring 64*a*.

According to the above configuration, dust can be suppressed from entering into the sensor housing chamber 4*h* through the opening 4*c* through which the wiring 64*a* for connecting the Hall sensor 76 and the control board 20 passes.

In one or more embodiments, the sensor housing chamber 4*b* is disposed on the outer surface of the housing 56.

According to the above configuration, since the sensor housing chamber 4*h* does not need to be disposed inside the housing 56, an internal space of the housing 56 can be made compact.

In one or more embodiments, the grinder 2, further comprises the magnetic shield member 80*a* covering the outside of the Hall sensor 76.

According to the above configuration, the Hall sensor 76 can be suppressed from being affected by a magnetic force from a magnetic force source outside the grinder 2.

In one or more embodiments, the Hall sensor 76 is arranged on the opposite side from the level gear 42 in the longitudinal direction of the grinder 2 as seen from the motor 14.

In the longitudinal direction of the grinder 2, a portion on the opposite side from the bevel gear 42 as seen from the motor 14 has more vacant space as compared to the side on Which the bevel gear 42 is arranged as seen from the motor 14. According to the above configuration, the space on the opposite side from the bevel gear 42 as seen from the motor 14 in the longitudinal direction of the grinder 2 can be utilized efficiently.

In one or more embodiments, the grinder 2 further comprises the power cable 28 configured to be connected to the AC power source and the power circuit 20*a* configured to convert AC power supplied from the power cable 28 to DC power.

In the grinder 2 that uses the AC power from the AC power source, the AC power is converted to the DC power by the power circuit 20*a*, and this DC power is supplied to the microcomputer of the control board 20 and the sensors, in general, different types of contactless sensors (such as photocoupler, photo interrupter) that are not a Magnetic sensor require greater DC power as compared to the magnetic sensor. Due to this, when a different type of contactless sensor that is not the magnetic sensor is to be used in the cover detection mechanism 60, a power circuit with a larger capacity needs to be used as the power circuit 20*a*. According to the above configuration, since the Hal) sensor 76 being the magnetic sensor is used in the cover detection mechanism 60 and the Hall sensor 76 does not require such large DC power, the power circuit 20*a* can be made compact. Further, in the grinder 2 that uses the AC power from tire AC power source, insulation must be secured between metal components) arranged in the vicinity of the attachment position of the wheel cover 12 (such as the gear housing 8 and the bearing box 10) and the wiring 64*a* connecting the power circuit 20*a* and the Hall sensor 76. According to the above configuration, since the Hall sensor 76 can be arranged at a position separated away from the attachment position of the wheel cover 12, the insulation between the metal component(s) arranged in the vicinity of the attachment position of the wheel cover 12 (such as the gear housing 8 and the bearing box 10) and the wiring 64*a* connecting the power circuit 20*a* and the Hail sensor 76 can be secured.

In one or more embodiments, the slide grooves 4*a*. 8*d* and the sensor housing chamber 4*b* communicating with the slide groove 4*a* are disposed on the outer surface of the housing 56. The link member 62 comprises the slide member 70 arranged from the slide grooves 4*a*, 8*d* over the sensor housing, chamber 4*b* and configured to slide with respect to the housing 56. The permanent magnet 74 is fixed in position with respect to the slide member 70. The Hall sensor 76 is arranged in the sensor housing chamber 4*b*. The grinder 2 further comprises the sensor cover 80 that covers lire slide grooves 4*a*, 8*d* and the sensor housing chamber 4*b*.

According to the above configuration since the slide member 70, the permanent magnet 74, and the Hall sensor 76 are arranged outside the housing 56, the internal space of the housing 56 can be made compact. Further, according to the above configuration, since the Hall sensor 76 and the permanent magnet 74 can be arranged at a position separated away from the attachment position of the wheel cover 12 on the housing 56, the detection accuracy of the cover detection mechanism 60 can be suppressed from being degraded by being affected by the dust generated in processing workpieces. Further, according to the above configuration, since the slide member 70, the permanent magnet 74, and the Hall sensor 76 are covered by the sensor cover 80, the detection accuracy of the cover detection mechanism 60 can be suppressed from being degraded by being affected by the dust.

In one or more embodiments, the sensor cover 80 incorporates therein the magnetic shield member 80*a* covering the sensor housing chamber 4*b*.

According to the above configuration, the 1 (all sensor 76 can be suppressed from being affected by the magnetic force from the magnetic force source outside the grinder 2.

In one or more embodiments, the spring receiving wall 4*f* (example of first spring receiving wall) is disposed in the slide grooves 4*a*. 8*d* of the housing 56. The slide member 70 comprises the spring receiving wall 70*g* (second spring receiving wall). The link member 62 further comprises the compression spring 72 having one end in contact with the spring receiving wall 4*f* and another end in contact with the spring receiving wall 70*g*.

According to the above configuration, after the slide member 70 has moved in response to the wheel cover 12 being attached (or detached), the slide member 70 can automatically be returned to its initial state in response to the wheel cover 12 being detached (or attached).

In one or more embodiments, the link member 62 further comprises the base member 66 fixed on the outer surface of the housing 56 and the swing member 68 configured to swing with respect to the base member 66 according to the wheel cover 12 being attached or detached. The slide member 70 is configured to slide with respect to the housing 56 according to swinging of the swing member 68.

According to the above configuration, the slide member 70 can be slid with respect to the housing 56 in accordance with whether the wheel cover 12 is attached or detached using a simple configuration.

In one or more embodiments, the base member 66 comprises the groove 66*b* in which the swing member 68 is arranged. The groove 66*b* is covered by the sensor cover 80.

According to the above configuration, since the swing member 68 arranged in the groove 66*b* of the base member 66 is exposed when the sensor cover 80 is detached, maintenance of the link member 62 can easily be carried out.

In one or more embodiments, the vicinity of die one end of the sensor cover 80 is fixed to the housing 56 by the screws 84. The vicinity of the other end of the sensor cover 80 is fixed to the housing 56 by other screws 82.

According to the above configuration, the sensor cover 80 can be ensured to be fixed to the housing 56 with a simple configuration.

In one or more embodiments, the one end of the sensor cover 80 is inserted into the housing 56. The vicinity of the other end of the sensor cover 80 is fixed to the housing 56 by the screws 82.

According to the above configuration, the number of screws for fixing the sensor cover 80 with respect to the housing 56 can be reduced. Thus, the number of components of the grinder 2 can be reduced.

In one or more embodiments, the control board 20 is configured to prohibit the motor 14 from being driven when the cover detection mechanism 60 does not detect that the wheel cover 12 is attached.

According to the above configuration, a situation in which the grinder 2 is used in a state of having the wheel cover 12 detached can be avoided.

In one or more embodiments, the accessory attached to the grinder 2 is the wheel cover 12.

According to the above configuration, whether the wheel cover 12 is attached to the grinder 2 or not can accurately be detected.

Second Embodiment

Figure 10:
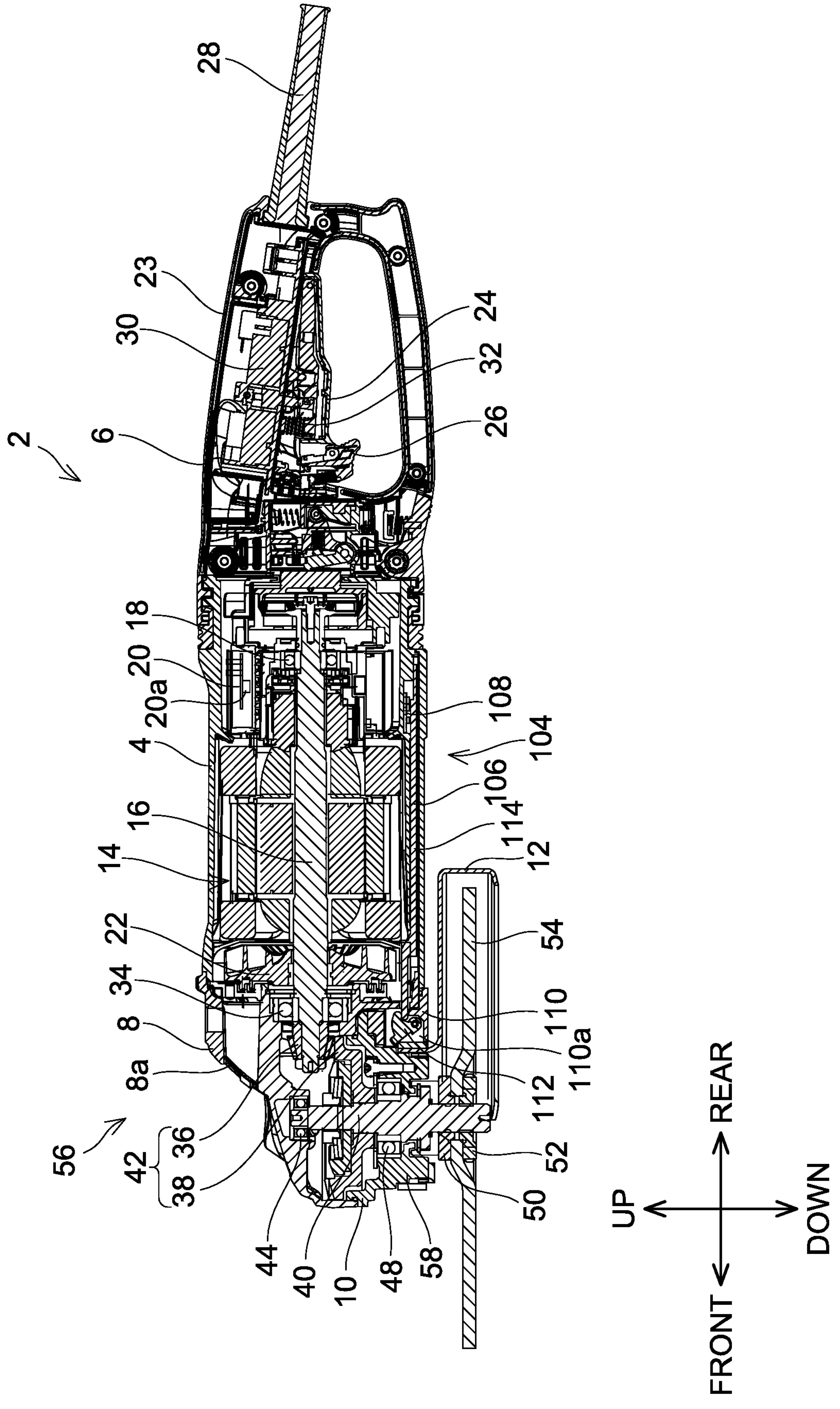
FIG. 10 is a vertical cross-sectional view of a grinder 102 of a second embodiment

As shown in FIG. 10, a grinder 102 of the present embodiment has a substantially same configuration as the grinder 2 of the first embodiment. Hereinbelow, features of the grinder 102 of the present embodiment that differ from the grinder 2 of the first embodiment will be described.

In the grinder 102 of the present embodiment, the control board 20 is arranged inside the motor housing 4 on a rear upper side from the motor 14.

The grinder 102 of the present embodiment comprises a cover detection mechanism 104 instead of the cover detection mechanism 60. The cover detection mechanism 104 comprises a link member 106 and a sensor substrate 108.

Figure 11:
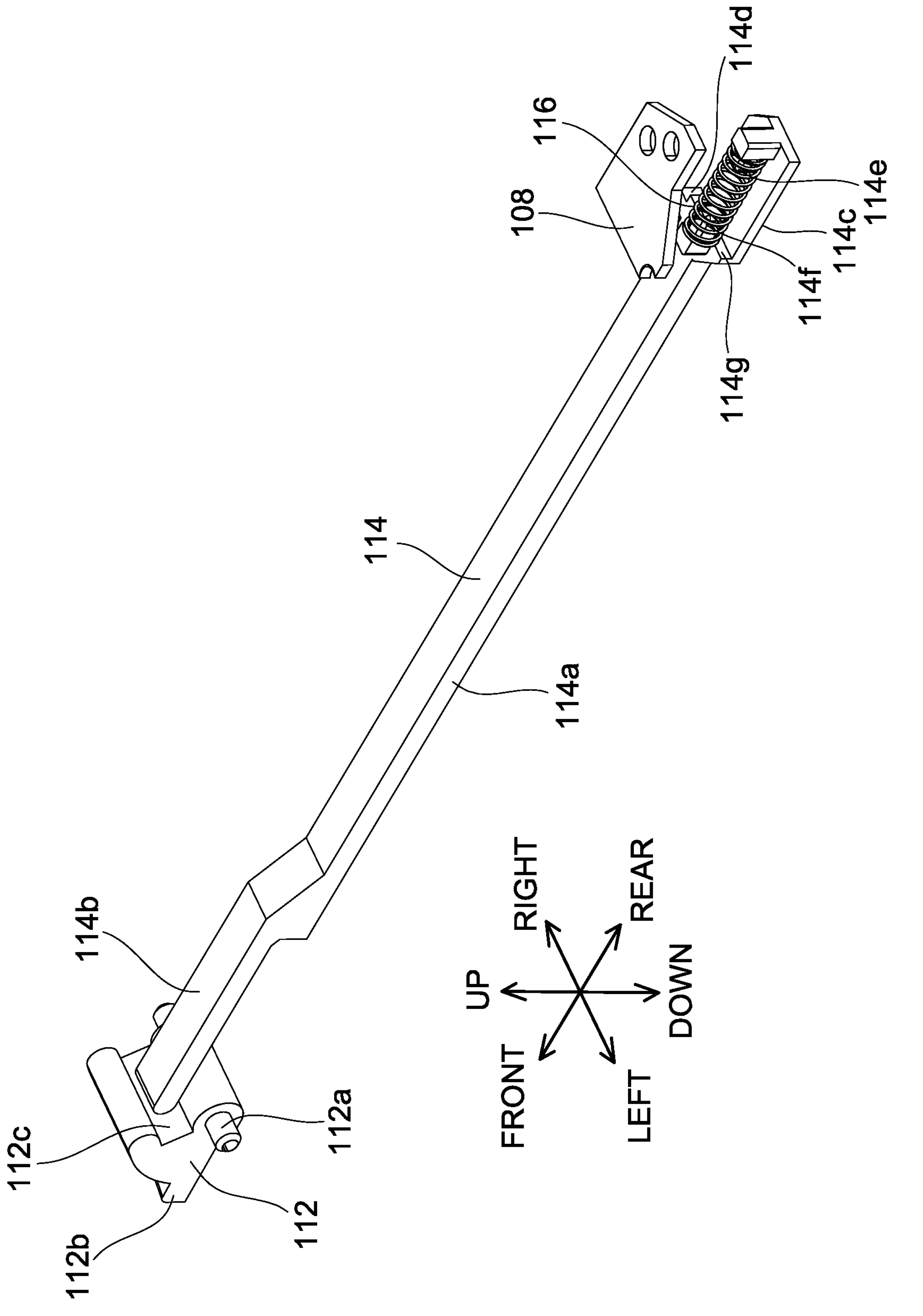
FIG. 11 is a perspective view seeing a positional relationship of a swing member 112, a slide member 114, a compression spring 116, and a sensor substrate 108 of the grinder 102 of the second embodiment from front left upper side.

The link member 106 includes a base member 110, a swing member 112, a slide member 114, and a compression spring 116 (see FIG. 11). The base member 110 is attached to the lower portion of the bearing box 10 on the rear side from the cover attachment portion 58, The base member 110 includes a through hole 110*a* penetrating in the front-rear direction.

As shown in FIG. 11, the swing member 112 includes a swing shaft 112*a*, a contact piece 112*b*, and a pressing piece 112*c*. The swing member 112 is arranged inside the through hole 110*a* of the base member 110. The swing member 112 is supported by the base member 110 such that it is capable of swinging about the swing shaft 112*a* that is along the left-right direction. The slide member 114 includes a slide bar 114*a*, a pressing portion 114*b*, a spring retaining portion. 114*c*, and a detector 114*d*. The slide bar 114*a* extends in the front-rear direction. The pressing portion 114*b* is disposed at a front end of the slide bar 114*a*. The pressing portion 114*b* is in contact with the pressing piece 112*c* of the swing member 112. The spring retaining portion 114*c* and the detector 114*d* are disposed at a rear end of the slide bar 114*a*. The spring retaining portion 114*c* includes a rear protrusion 114*e* inserted into the compression spring 116 from behind, a front protrusion 114*f* inserted into the compression spring 116 from front, and a spring receiving wall 114*g* contacting a front end of the compression spring 116. A permanent magnet 118 (see FIGS. 13 and 15) is disposed in the detector 114*d*.

The sensor substrate 108 is arranged above the detector 114*d* of the slide member 114. The sensor substrate 108 includes a Hall sensor 120 (see FIGS. 13 and 15) configured to detect a magnetic force front the permanent magnet 118.

Figure 13:
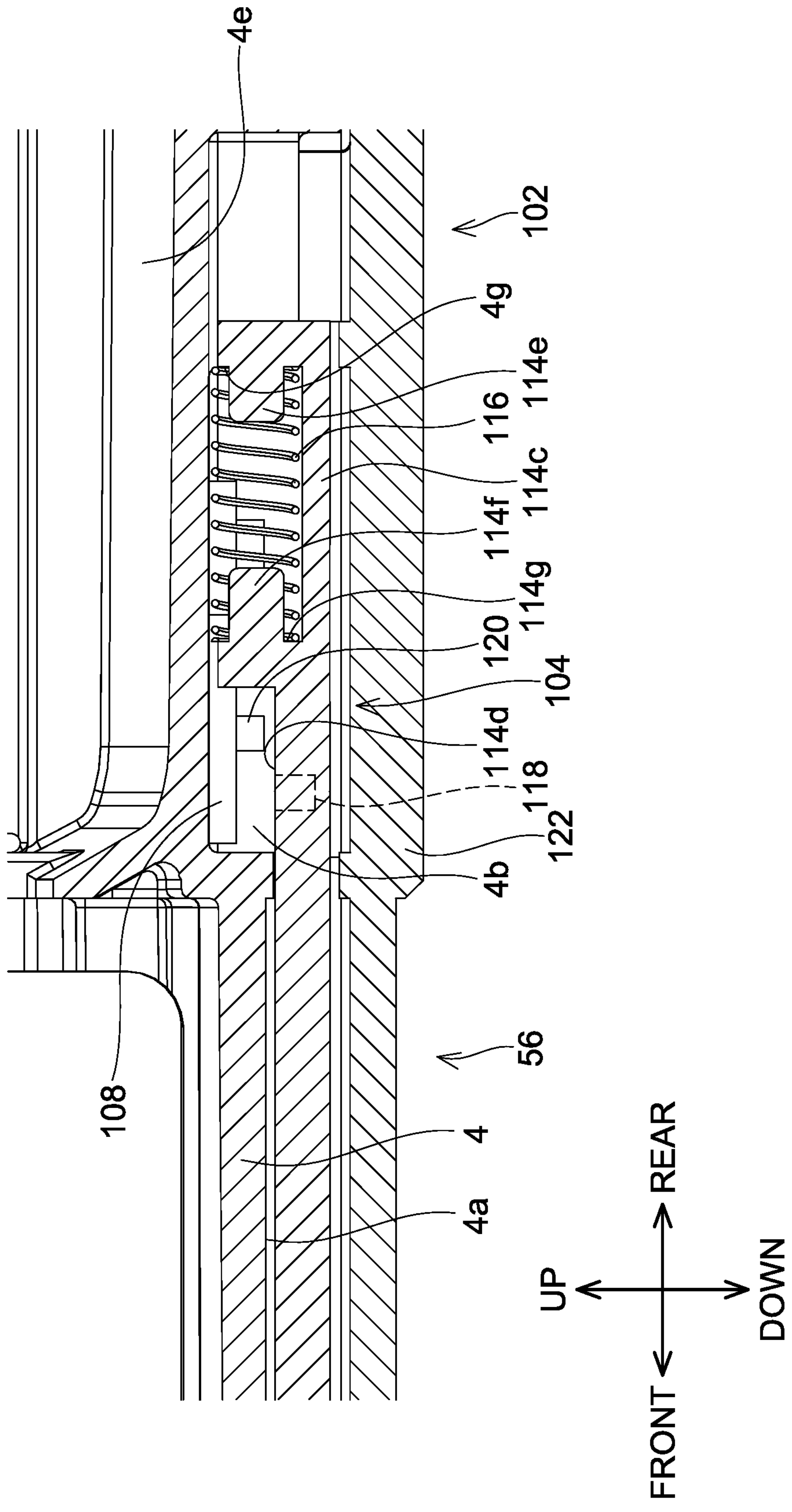
FIG. 13 is a vertical cross-sectional view of a vicinity of the sensor substrate 108 of the grinder 102 of the second embodiment in the state having the wheel cover 12 detached.
Figure 15:
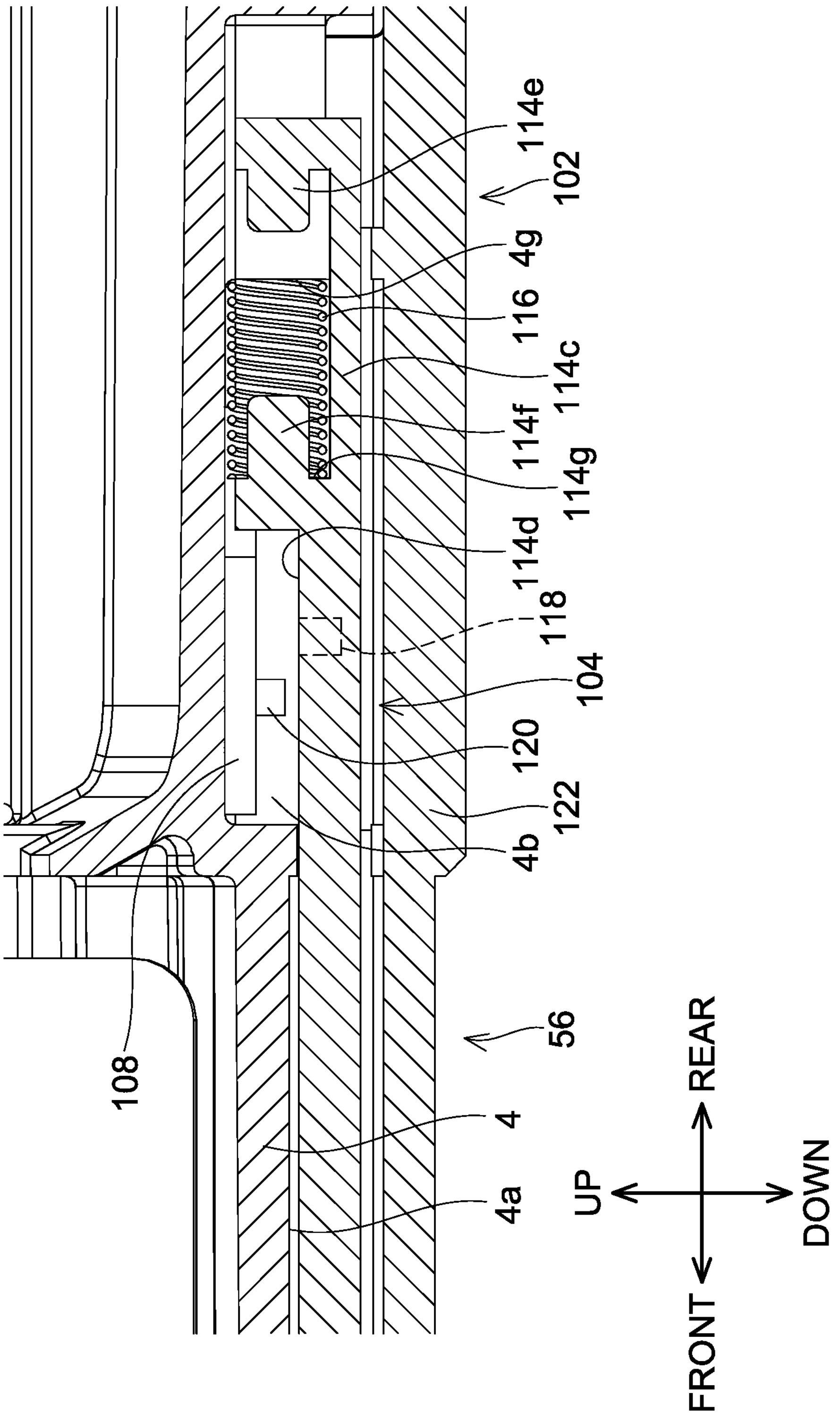
FIG. 15 is a vertical cross-sectional view of the vicinity of the sensor substrate 108 of the grinder 102 of the second embodiment in the state having the wheel cover 12 attached.

As shown in FIGS. 13 and 15, the slide groove 4*a* and the sensor housing chamber 4*b* are defined in the lower outer surface of the motor housing 4. Peripheries of the slide groove 4*a* and the sensor housing chamber 4*b* are surrounded by ribs (not shown). The slide groove 4*a* is not communicated with the inside of the motor housing 4 (motor housing chamber 4*e*). The sensor housing chamber 4*b* is communicated with the inside of the motor housing 4 (motor housing chamber 4*e*) through an opening (not shown). The sensor substrate 108 is housed in the sensor housing chamber 4*b* so as to close the opening of the sensor housing chamber 4*b*, and is fixed to the motor housing 4 by screws (not shown). The sensor substrate 108 is connected to the control board 20 via a wiring (not shown). The wiring is laid out to extend front the sensor housing chamber 4*b* to the motor housing chamber 4*e* through the opening.

Figure 12:
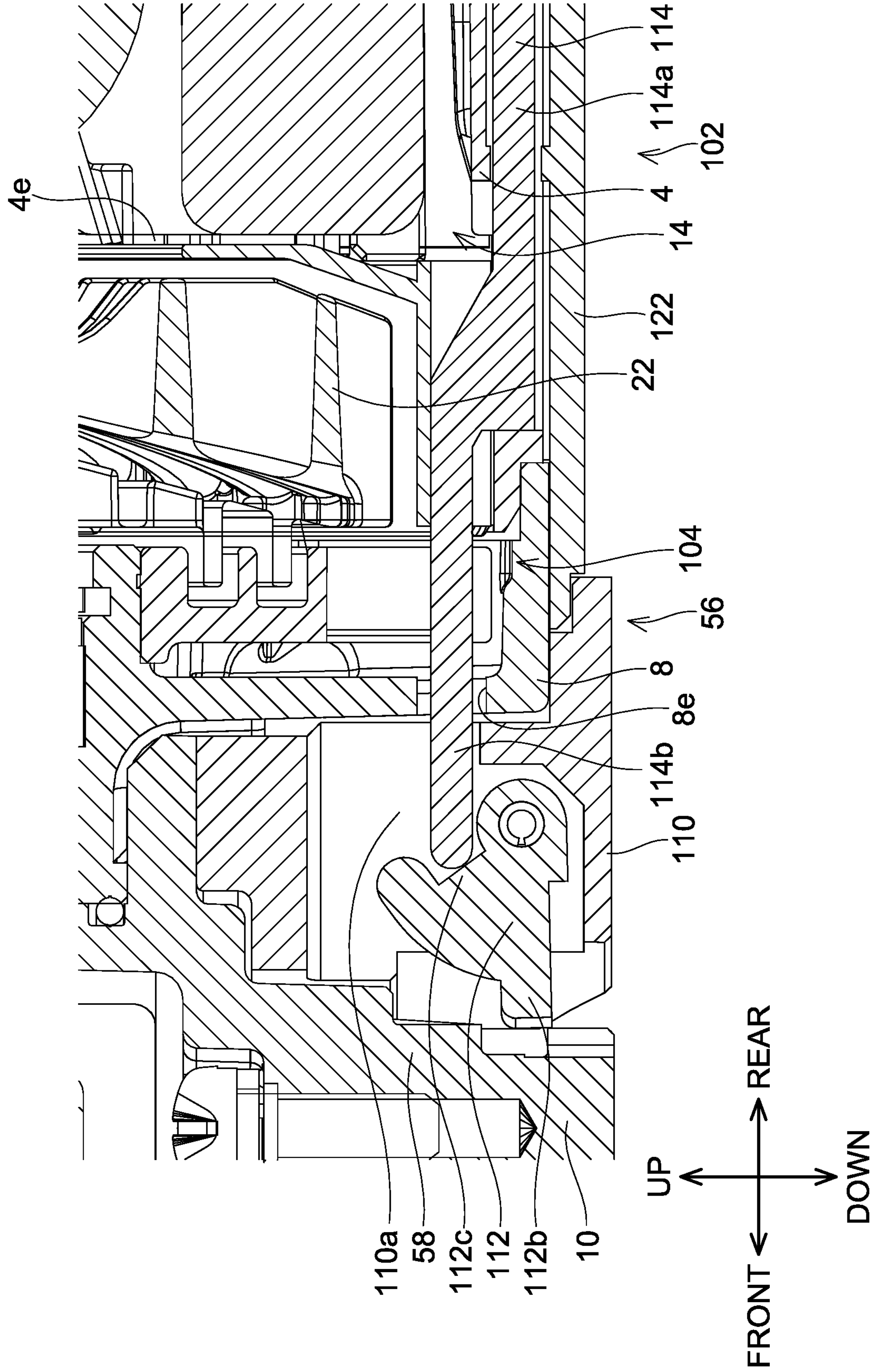
FIG. 12 is a vertical cross-sectional view of a vicinity of the swing member 112 of the grinder 102 of the second embodiment in a state having the wheel cover 12 detached.
Figure 14:
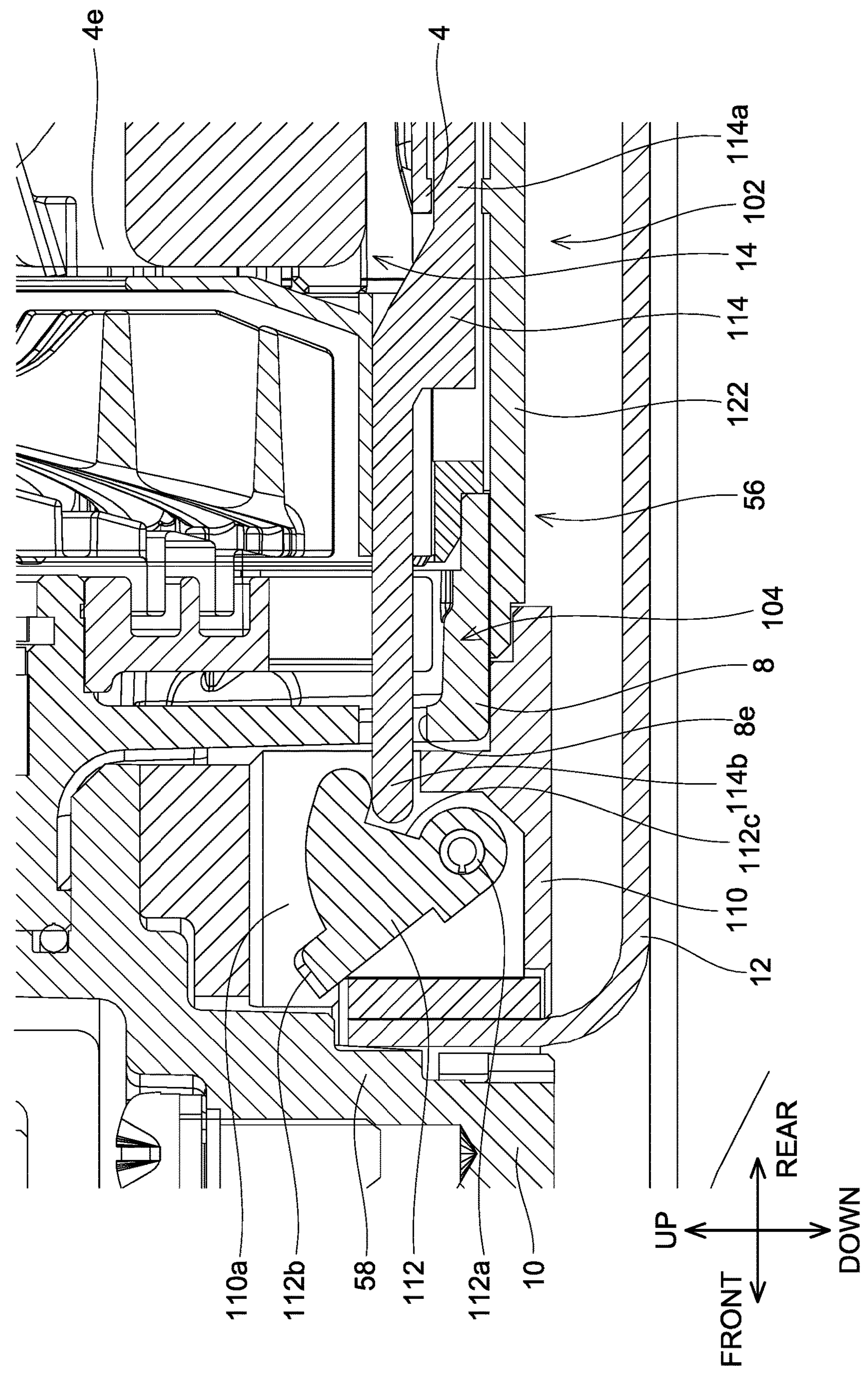
FIG. 14 is a vertical cross-sectional view of the vicinity of the swing member 112 of the grinder 102 of the second embodiment in a state having the wheel cover 12 attached.

As shown in FIGS. 12 and 14, a through hole 8*e* is defined in the lower portion of the gear housing 8. The slide member 114 of the link member 106 has the slide bar 114*a* arranged in die slide groove 4*a* of the motor housing 4, the pressing portion 114*b* penetrating the through hole 8*e* of the gear housing 8, and the spring retaining portion 114*c* and the detector 114*d* housed in the sensor housing chamber 4*b*. The slide member 114 is supported by the housing 56 so as to be slidable in the front-rear direction. As shown in FIGS. 13 and 15, in a state where the slide member 114 is attached to the housing 56, a rear end of the compression spring 116 contacts a spring receiving wall 4*g* arranged in the sensor housing chamber 4*b* of the motor housing 4.

The slide groove 4*a* of the motor housing 4 and the sensor housing chamber 4*b* are covered by the sensor cover 122. The sensor cover 122 is fixed to the motor housing 4 by screws (not shown) in a state of having its front end inserted into the gear housing 8. The slide member 114, the compression spring 116, and the sensor substrate 108 are insulated from outside by the sensor cover 122.

As shown in FIGS. 12 and 13, in the state where the wheel cover 12 is not attached to the housing 56, lire slide member 114 is biased frontward with respect to the housing 56 by the compression spring 116. In this initial state, the permanent magnet 118 of the detector 114*d* is arranged at a position offset frontward from the Hal) sensor 120 of the sensor substrate 108 as shown in FIG. 13. In this case, the control board 20 determines that the wheel cover 12 is not attached to die housing 56 based on a detection signal from the Hall sensor 120. For example, Ore control board 20 prohibits the rotation of the motor 14 when the wheel cover 12 is not attached to the housing 56. Further, as shown in FIG. 12, the swing member 112 has the pressing piece 112*c* positioned frontward by being pressed by the pressing portion 114*b* of the slide member 114, and thus the contact piece 112*b* is positioned frontward.

As shown in FIGS. 14 and 15, when the wheel cover 12 is attached to the housing 56, the upper end of the wheel cover 12 contacts the contact piece 112*b* of the swing member 112 by which the contact piece 112*b* is lifted upward. Due to this, the swing member 112 swings and the pressing piece 112*c* moves rearward, and the slide member 114 slides rearward against the biasing force of the compression spring 116. In this state, as shown in FIG. 15, the permanent magnet 118 of the detector 114*d* is arranged at a position offset rearward from the Hall sensor 120 of the sensor substrate 108. In this case, the control board 20 determines that the wheel cover 12 is attached to the housing 56 based on the detection signal from the Hall sensor 120, For example, the control hoard 20 allows the rotation of the motor 14 when the wheel cover 12 is attached to the housing 56. When the wheel cover 12 is detached from the housing 56, the slide member 114 moves frontward by the biasing force of the compression spring 116 and the swing member 112 swings, by which it returns to its initial state shown in FIGS. 12 and 13.

As above, in one or more embodiments, the grinder 102 (example of electric power tool) comprises: the motor 14; the control board 20 (example of control device) configured to control the motor 14; the bevel gear 42 (example of power transmission mechanism) connected to the motor 14; the housing 56 that houses the motor 14, the control board 20, and the bevel gear 42; the spindle 40 (example of end tool holder) connected to the bevel gear 42; the wheel cover 12 (example of accessory) configured to be detachably attached to the housing 56; and the cover detection mechanism 104 (example of detector) configured to detect whether the wheel cover 12 is attached or not. The cover detection mechanism 104 comprises: the link member 106 configured to move with respect to the housing 56 according to the wheel cover 12 being attached or detached; the permanent magnet 118 (example of magnet) fixed in position with respect to one of the link member 106 and the housing 56 (such as the link member 106); and the Hall sensor 120 (example of magnetic sensor) fixed in position with respect to another of the link member 106 and the housing 56 (such as the housing 56).

According to the above configuration, since whether the wheel cover 12 is attached to the housing 56 or not is detected by a contactless cover detection mechanism 104 having the permanent magnet 118 and the Hall sensor 120, false detection in the cover detection mechanism 104 caused by vibration and impact can be suppressed from occurring. Further, according to the above configuration, the permanent magnet 118 is fixed in position with respect to one of the link member 106 and the housing 56 and the Hall sensor 120 is fixed in position with respect to the other of the link member 106 and the housing 56. Since the link member 106 is not something that is to be attached or detached with respect to the housing 56 for operation, a variation is not likely to occur in a relative positional relationship between the link member 106 and the housing 56. Due to this, according to the above grinder 102, a variation in a relative positional relationship between the permanent magnet 118 and the Hall sensor 120 can be suppressed from occurring, and detection accuracy of the cover detection mechanism 104 can be improved.

In one or more embodiments, the permanent magnet 118 is fixed in position with respect to the link member 106. The Hall sensor 120 is fixed in position with respect to the housing 56.

If the permanent magnet 118 is fixed in position with respect to the housing 56 and the Hall sensor 120 is fixed in position with respect to the link member 106, the Hall sensor 120 would move with respect to the housing 56 when the link member 106 moves with respect to the housing 56, thus a wiring connecting the control board 20 and the Hail sensor 120 would thereby be moved. According to the above configuration, since the permanent magnet 118 is fixed in position with respect to the link member 106 and the Hall sensor 120 is fixed in position with respect to the housing 56, the Hall sensor 120 does not move with respect to the housing 56 even when the link member 106 moves with respect to the housing 56, thus the wiring connecting the control board 20 and the Hall sensor 120 is not moved.

In one or more embodiments, the link member 106 comprises the swing member 112 configured to swing with respect to the housing 56 according to the wheel cover 12 being attached or detached, and the slide member 114 configured to slide with respect to the housing 56 according to swinging of the swing member 112.

In the grinder 102, the attachment position of the wheel cover 12 on the housing 56 is arranged in the vicinity of the spindle 40. The vicinity of the spindle 40 is a position that is highly likely to be affected by dust generated in processing workpieces. Due to this, if the Hall sensor 120 and the permanent magnet 118 are arranged in the vicinity of the attachment position of the wheel cover 12, the detection accuracy of the cover detection mechanism 104 could be degraded by being affected by the dust generated in processing workpieces. According to the above configuration, since the link member 106 comprises the swing member 112 and the slide member 114, the Hall sensor 120 and the permanent magnet 118 can be arranged at a position separated away from the attachment position of the wheel cover 12 on the housing 56. The detection accuracy of the cover detection mechanism 104 can be suppressed from being degraded by being affected by the dust generated in processing workpieces.

In one or more embodiments, the slide member 114 is configured to move along a longitudinal direction of the grinder 102 with respect to the housing 56.

According to the above configuration, the Hall sensor 120 and the permanent magnet 118 can be arranged at a position that is further separated away from the attachment position of the wheel cover 12 on the housing 56.

In one or more embodiments, the link member 106 further comprises the compression spring 116 (example of bias member) biasing the slide member 114.

According to the above configuration, after the link member 106 has moved in response to the wheel cover 12 being attached, the link member 106 can automatically be returned to its initial state in response to the wheel cover 12 being detached.

In one or more embodiments, the motor 14 is housed in the motor housing chamber 4*e*. The permanent magnet 118 and the Hall sensor 120 are housed in the sensor housing chamber 4*b* arranged separately from the motor housing chamber 4*e*.

Upon using the grinder 102, cooling air for cooling the motor 14 flow's in the motor housing chamber 4*e*. Dust may be contained in the cooling air, and if the permanent magnet 118 and the Hall sensor 120 are housed in the motor housing chamber 4*e*, the detection accuracy of the cover detection mechanism 104 could be degraded by being affected by the dust. According to tire above configuration, since the permanent magnet 118 and the Hall sensor 120 are housed in the sensor housing chamber 4*b* that is arranged separately from the motor housing chamber 4*e*, the detection accuracy of the cover detection mechanism 104 can be suppressed from being degraded by being affected by the dust even if the dust is contained in the cooling air flowing in the motor housing chamber 4*c*.

In one or more embodiments, the sensor housing chamber 4*b* is disposed on the outer surface of the housing 56.

According to the above configuration, since the sensor housing chamber 4*b* does not need to be disposed inside the housing 56, the internal space of the housing 56 can be made compact.

In one or more embodiments, the Hall sensor 120 is arranged on the opposite side from the bevel gear 42 in the longitudinal direction of the grinder 102 as seen from the motor 14.

In the longitudinal direction of the grinder 102, a portion on the opposite side from the bevel gear 42 as seen from the motor 14 has more vacant space as compared to the side on which the bevel gear 42 is arranged as seen from the motor 14. According to the above configuration, the space on the opposite side from the bevel gear 42 as seen from the motor 14 in the longitudinal direction of the grinder 102 can be utilized efficiently.

In one or more embodiments, the grinder 102 further comprises the power cable 28 configured to be connected to the AC power source and the power circuit 20*a* configured to convert AC power supplied from the power cable 28 to DC power.

In the grinder 102 that uses the AC power from the AC power source, the AC power is converted to the DC power by the power circuit 20*a*, and this DC power is supplied to the microcomputer of the control board 20 and the sensors. In general, different types of contactless sensors (such as photocoupler, photo interrupter) that are not a magnetic sensor require greater DC power as compared to the magnetic sensor. Due to this, when a different type of contactless sensor that is not the magnetic sensor is to be used in the cover detection mechanism 104, a power circuit with a larger capacity needs to be used as the power circuit 20*a*. According to the above configuration, since the Hall sensor 120 being die magnetic sensor is used in the cover detection mechanism 104 and the Hall sensor 120 does not require such large DO power, the power circuit 20*a* can be made compact. Further, in the grinder 102 that uses the AC power from the AC power source, insulation must be secured between metal components) arranged in the vicinity of the attachment position of the wheel cover 12 (such as the gear housing 8 and the bearing box 10) and the wiring connecting the power circuit 20*a* and the Hall sensor 120. According to the above configuration, since the Hall sensor 120 can be arranged at a position separated away from the attachment position of the wheel cover 12, the insulation between the metal components) arranged in the vicinity of the attachment position of the wheel cover 12 (such as the gear housing 8 and the bearing box 10) and the wiring connecting the power circuit 20*a* and the Hall sensor 120 can be secured.

In one or more embodiments, the slide groove 4*a* and the sensor housing chamber 4*b* communicating with the slide groove 4*a* are disposed on the outer surface of the housing 56. The link member 106 comprises the slide member 114 arranged from the slide groove 4*a* over the sensor housing chamber 4*b* and configured to slide with respect to the housing 56. The permanent magnet 118 is fixed in position with respect to the slide member 114. The Hall sensor 120 is arranged in the sensor housing chamber 4*b*. The grinder 102 further comprises the sensor cover 122 that covers the slide groove 4*a* and the sensor housing chamber 4*b*.

According to the above configuration, since the si ide member 114, the permanent magnet 118, and the Hall sensor 120 are arranged outside the housing 56, the internal space of the housing 56 can be made compact. Further, according to the above configuration, since the Hall sensor 120 and the permanent magnet 118 can be arranged at a position separated away from the attachment position of the wheel cover 12 on the housing 56, the detection accuracy of the cover detection mechanism 104 can be suppressed from being degraded by being affected by the dust generated in processing workpieces. Further, according to the above configuration, since the slide member 114, the permanent magnet 118, and the Hall sensor 120 are covered by the sensor cover 122, the detection accuracy of the cover detection mechanism 104 can be suppressed from being degraded by being affected by the dust.

In one or more embodiments, the spring receiving wall 4*g* (example of first spring receiving wall) is disposed in the sensor housing chamber 4*b* of the housing 56. The slide member 114 comprises the spring receiving wall 114*g* (example of second spring receiving wall). The link member 106 further comprises the compression spring 116 having one end in contact with the spring receiving wall 4*g* and another end in contact with tire spring receiving wall 114*g*.

According to the above configuration after the slide member 114 has moved in response to the wheel cover 12 being attached (or detached), the slide member 114 can automatically be returned to its initial state in response to the wheel cover 12 being detached (or attached).

In one or more embodiments, the link member 106 further comprises the base member 110 fixed on the outer surface of the housing 56 and fire swing member 112 configured to swing with respect to the base member 110 according to the wheel cover 12 being attached or detached. The slide member 114 is configured to slide with respect to the housing 56 according to swinging of the swing member 112.

According to the above configuration, the slide member 114 can be slid with respect to the housing 56 in accordance with whether the wheel cover 12 is attached or detached using a simple configuration.

In one or more embodiments, one end of the sensor cover 122 is inserted into an inside of the housing 56, A vicinity of the other end of the sensor cover 122 is fixed to the housing 56 by the screws.

According to the above configuration, the number of screws for fixing the sensor cover 122 with respect to the housing 56 can be reduced, Thus, the number of components of the grinder 102 can be reduced.

In one or more embodiments, the control board 20 is configured to prohibit the motor 14 from being driven when the cover detection mechanism 104 does not detect that the wheel cover 12 is attached.

According to the above configuration, a situation in which the grinder 102 is used in a state of having the wheel cover 12 detached can be avoided.

In one or more embodiments, the accessory attached to the grinder 102 is the wheel cover 12.

According to the above configuration, whether the wheel cover 12 is attached to the grinder 102 or not can accurately be detected.

(Variants)

In the above embodiments, the cases in which the electric power tool is grinder 2, 102, the power transmission mechanism is the bevel gear 42, the end tool holder is the spindle 40, and the accessory is the wheel cover 12 have been exemplified, however, the electric power tool may be another type of electric power tool, the power transmission mechanism may be another type of reduction gear mechanism, the end tool holder may be another type of end tool holder, and the accessory may be another type of accessory. For example, a handle detection mechanism configured to detect whether a side handle being an accessory is attached to the handle attaching portion 8*b* or 8*c* or not may be realized by a configuration similar to that of the cover detection mechanism 60 of the first embodiment or the cover detection mechanism 104 of the second embodiment.

In the above embodiments, the sensor housing chamber 4*b* may be disposed inside the housing 56. For example, the inside of the motor housing 4 may be partitioned into the motor housing chamber 4*e* configured to house the motor 14 and the sensor housing chamber 4*b* configured to house the permanent magnet 74, 118 and the Hall sensor 76, 120.

In the above embodiments, the Hall sensor 76, 120 may be arranged at a position overlapping the motor 14 in the longitudinal direction of the grinder 2, 102.

In the above embodiments, the power circuit 20*a* may be disposed on a separate substrate from the control board 20.

In the above embodiments, the grinder 2, 102 may be configured to operate using DC power supplied from a battery pack configured to be detachably attached to the housing 56 instead of operating by the AC power supplied through the power cable 28.

In the above embodiments, a brushless motor may be used instead of the brush motor as the motor 14.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. An electric power tool comprising:
- a motor;
- a control device configured to control the motor;
- a power transmission mechanism connected to the motor;
- a housing that houses the motor, the control device and the power transmission mechanism;
- an end tool holder connected to the power transmission mechanism;
- an accessory configured to be detachably attached to the housing; and
- a detector configured to detect whether the accessory is attached or not, wherein the detector comprises:
- a link member configured to move with respect to the housing according to the accessory being attached or detached;
- a magnet fixed in position with respect to one of the link member and the housing; and
- a magnetic sensor fixed in position with respect to another of the link member and the housing, the link member comprises:
- a movement member configured to move with respect to the housing according to the accessory being attached or detached; and
- a slide member configured to slide with respect to the housing according to moving of the movement member, the slide member comprises:
- a slide bar extending along a longitudinal direction of the electric power tool;
- a movement portion disposed at one end of the slide bar and configured to move along with the movement member; and
- a mount portion disposed at another end of the slide bar and in which one of the magnet and the magnetic sensor is mounted, and the one of the magnet and the magnetic sensor that is mounted in the mount portion is located on an opposite side from the movement member as seen from the motor in the longitudinal direction of the electric power tool.

2. The electric power tool according to claim 1, wherein the magnet is fixed in position with respect to the link member, and the magnetic sensor is fixed in position with respect to the housing.

3. The electric power tool according to claim 1, wherein the slide member is configured to move along the longitudinal direction of the electric power tool with respect to the housing.

4. The electric power tool according to claim 1, wherein the link member further comprises a bias member biasing the slide member.

5. The electric power tool according to claim 1, wherein the motor is housed in a motor housing chamber, and the magnet and the magnetic sensor are housed in a sensor housing chamber arranged separately from the motor housing chamber.

6. The electric power tool according to claim 5, wherein an opening through which a wiring is to pass is defined in the sensor housing chamber, the wiring being configured to connect the magnetic sensor and the control device to each other, and the electric power tool further comprises a sealing member closing the opening around the wiring.

7. The electric power tool according to claim 5, wherein the sensor housing chamber is disposed on an outer surface of the housing.

8. The electric power tool according to claim 1, further comprising a magnetic shield member covering an outside of the magnetic sensor.

9. The electric power tool according to claim 1, wherein the magnetic sensor is arranged on an opposite side from the power transmission mechanism in the longitudinal direction of the power tool as seen from the motor.

10. The electric power tool according to claim 1, further comprising:
- a power cable configured to be connected to an AC power source; and
- a power circuit configured to convert AC power supplied from the power cable to DC power.

11. The electric power tool according to claim 1, further comprising a battery pack configured to be detachably attached to the housing, wherein the electric power tool is configured to be operated by DC power supplied from the battery pack.

12. The electric power tool according to claim 1, wherein the control device is configured to prohibit the motor from being driven when the detector does not detect that the accessory is attached.

13. The electric power tool according to claim 1, wherein the accessory is a wheel cover.

14. An electric power tool comprising:

a motor;

a control device configured to control the motor;

a power transmission mechanism connected to the motor;

a housing that houses the motor, the control device and the power transmission mechanism;

an end tool holder connected to the power transmission mechanism;

an accessory configured to be detachably attached to the housing; and a detector configured to detect whether the accessory is attached or not, wherein the detector comprises:

a link member configured to move with respect to the housing according to the accessory being attached or detached;

a magnet fixed in position with respect to one of the link member and the housing; and a magnetic sensor fixed in position with respect to another of the link member and the housing, a slide groove and a sensor housing chamber communicating with the slide groove are disposed on an outer surface of the housing, the link member comprises a slide member arranged from the slide groove over the sensor housing chamber, and configured to slide with respect to the housing, the magnet is fixed in position with respect to the slide member, the magnetic sensor is arranged in the sensor housing chamber, and the electric power tool further comprises a sensor cover that covers the slide groove and the sensor housing chamber.

15. The electric power tool according to claim 14, wherein the sensor cover incorporates therein a magnetic shield member covering the sensor housing chamber.

16. The electric power tool according to claim 14, wherein a first spring receiving wall is disposed in the slide groove or the sensor housing chamber of the housing, the slide member comprises a second spring receiving wall, and the link member further comprises a compression spring having one end in contact with the first spring receiving wall and another end in contact with the second spring receiving wall.

17. The electric power tool according to claim 14, wherein the link member further comprises:

a base member fixed on the outer surface of the housing; and a swing member configured to swing with respect to the base member according to the accessory being attached or detached, and the slide member is configured to slide with respect to the housing according to swinging of the swing member.

18. The electric power tool according to claim 17, wherein the base member comprises a groove in which the swing member is arranged, and the groove is covered by the sensor cover.

19. The electric power tool according to claim 14, wherein a vicinity of one end of the sensor cover is fixed to the housing by a screw, and a vicinity of another end of the sensor cover is fixed to the housing by another screw.

20. The electric power tool according to claim 14, wherein one end of the sensor cover is inserted into an inside of the housing, and a vicinity of another end of the sensor cover is fixed to the housing by a screw.

21. An electric power tool comprising:

a motor;

a control device configured to control the motor;

a power transmission mechanism connected to the motor;

a housing that houses the motor, the control device and the power transmission mechanism;

an end tool holder connected to the power transmission mechanism;

an accessory configured to be detachably attached to the housing; and a detector configured to detect whether the accessory is attached or not, wherein the detector comprises:

a link member configured to move with respect to the housing according to the accessory being attached or detached;

a magnet fixed in position with respect to one of the link member and the housing; and a magnetic sensor fixed in position with respect to another of the link member and the housing, the magnet is fixed in position with respect to the link member, the magnetic sensor is fixed in position with respect to the housing, the link member comprises:

a swing member configured to swing with respect to the housing according to the accessory being attached or detached; and a slide member configured to slide with respect to the housing according to swinging of the swing member, the slide member is configured to move along a longitudinal direction of the electric power tool with respect to the housing, the link member further comprises a bias member biasing the slide member, the motor is housed in a motor housing chamber, the magnet and the magnetic sensor are housed in a sensor housing chamber arranged separately from the motor housing chamber, an opening through which a wiring is to pass is defined in the sensor housing chamber, the wiring being configured to connect the magnetic sensor and the control device to each other, the electric power tool further comprises a sealing member closing the opening around the wiring, the sensor housing chamber is disposed on an outer surface of the housing, the electric power tool further comprises a magnetic shield member covering an outside of the magnetic sensor, the magnetic sensor is arranged on an opposite side from the power transmission mechanism in the longitudinal direction of the power tool as seen from the motor, a slide groove is disposed on an outer surface of the housing, the sensor housing chamber communicates with the slide groove, the slide member is arranged from the slide groove over the sensor housing chamber, the magnet is fixed in position with respect to the slide member, the magnetic sensor is arranged in the sensor housing chamber, the electric power tool further comprises a sensor cover that covers the slide groove and the sensor housing chamber, the sensor cover incorporates therein the magnetic shield member, the magnetic shield member covers the sensor housing chamber, a first spring receiving wall is disposed in the slide groove or the sensor housing chamber of the housing, the slide member comprises a second spring receiving wall, the link member further comprises a compression spring, as the bias member, having one end in contact with the first spring receiving wall and another end in contact with the second spring receiving wall, the link member further comprises:

a base member fixed on the outer surface of the housing; and the swing member configured to swing with respect to the base member according to the accessory being attached or detached, the base member comprises a groove in which the swing member is arranged, the groove of the base member is covered by the sensor cover, a vicinity of one end of the sensor cover is fixed to the housing by a screw, and one end of the sensor cover is inserted into an inside of the housing, the control device is configured to prohibits the motor from being driven, when the detector does not detect that the accessory is attached, and the accessory is a wheel cover.

22. An electric power tool comprising:

a motor;

a control device configured to control the motor;

a power transmission mechanism connected to the motor;

a housing that houses the motor, the control device and the power transmission mechanism;

an end tool holder connected to the power transmission mechanism;

an accessory configured to be detachably attached to the housing; and a detector configured to detect whether the accessory is attached or not, wherein the detector comprises:

a link member configured to move with respect to the housing according to the accessory being attached or detached;

a magnet fixed in position with respect to one of the link member and the housing; and a magnetic sensor fixed in position with respect to another of the link member and the housing, the link member comprises:

a movement member configured to move with respect to the housing according to the accessory being attached or detached; and a slide member configured to slide with respect to the housing according to moving of the movement member, the slide member comprises:

a slide bar extending along a longitudinal direction of the electric power tool;

a movement portion disposed at one end of the slide bar and configured to move along with the movement member; and a mount portion disposed at another end of the slide bar and in which one of the magnet and the magnetic sensor is mounted, and the one of the magnet and the magnetic sensor that is mounted in the mount portion is located on an opposite side from the movement member as seen from the motor in the longitudinal direction of the electric power tool, when a position of the link member with respect to the housing with the accessory detached from the housing is defined as a detachment position and the position of the link member with respect to the housing with the accessory attached to the housing is defined as an attachment position, the link member is configured to move from the detachment position to the attachment position via an intermediate position, and at the intermediate position, a distance between the magnet and the magnetic sensor is smaller than at the detachment position and the attachment position.

23. The electric power tool according to claim 22, wherein when the link member is located at the detachment position, the magnet is offset from in a direction in which the magnet separates away from the end tool holder, and when the link member is located at the attachment position, the magnet is offset from the magnetic sensor in a direction in which the magnet approaches the end tool holder.

24. The electric power tool according to claim 22, further comprising a bias member biasing the link member toward the detachment position with respect to the housing, wherein with the accessory detached from the housing, the link member is held in the detachment position by a biasing force of the bias member, and by the accessory being attached to the housing, the link member moves from the detachment position to the attachment position against the biasing force of the bias member.

* * * * *